(12) United States Patent
Mooren et al.

(10) Patent No.: US 11,598,446 B2
(45) Date of Patent: Mar. 7, 2023

(54) HANDLE CONNECTION SYSTEMS AND METHODS

(71) Applicant: Kohler Co., Kohler, WI (US)

(72) Inventors: Brian J. Mooren, Sheboygan Falls, WI (US); Andrew J. Rieth, Howards Grove, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 17/746,413

(22) Filed: May 17, 2022

(65) Prior Publication Data

US 2022/0275882 A1    Sep. 1, 2022

Related U.S. Application Data

(60) Continuation of application No. 16/986,840, filed on Aug. 6, 2020, now Pat. No. 11,346,463, which is a division of application No. 15/982,727, filed on May 17, 2018, now Pat. No. 10,774,946.

(51) Int. Cl.
| | |
|---|---|
| *F16K 31/60* | (2006.01) |
| *B25G 3/18* | (2006.01) |
| *B25G 3/12* | (2006.01) |
| *E03C 1/04* | (2006.01) |

(52) U.S. Cl.
CPC ............... *F16K 31/60* (2013.01); *B25G 3/12* (2013.01); *B25G 3/18* (2013.01); *E03C 1/0412* (2013.01); *F16K 31/607* (2013.01)

(58) Field of Classification Search
CPC ......... F16K 31/60; F16K 31/607; B25G 3/12; B25G 3/18; E03C 1/0412

USPC ............ 251/291–293; 137/801, 359; 74/553; 16/422, 441
See application file for complete search history.

(56) References Cited

U.S. PATENT DOCUMENTS

| | | | |
|---|---|---|---|
| 3,396,604 A * | 8/1968 | Samuels ................. | F16K 31/60 16/DIG. 30 |
| 3,481,360 A | 12/1969 | Gillberg | |
| 3,887,963 A * | 6/1975 | Harmon ................... | G05G 1/10 16/DIG. 30 |
| 3,929,317 A | 12/1975 | Cohn et al. | |

(Continued)

FOREIGN PATENT DOCUMENTS

| | | |
|---|---|---|
| CN | 2329815 Y | 7/1999 |
| CN | 203963217 U | 11/2014 |

(Continued)

OTHER PUBLICATIONS

Chinese First Office Action on CN Appl No. 201910406227.9 dated Aug. 5, 2020 (11 pages).

(Continued)

*Primary Examiner* — John Bastianelli
(74) *Attorney, Agent, or Firm* — Foley & Lardner LLP

(57) ABSTRACT

A process includes inserting a valve cartridge in a fitting of a yoke. The process also includes placing a ring around the fitting after inserting the valve cartridge in the fitting. The process also includes placing a nut around the fitting after placing the ring around the fitting. The process also includes threading the nut onto the fitting after placing the nut around the fitting. The process also includes tightening the nut against the ring. The process also includes pressing a handle onto the ring after tightening the nut against the ring.

14 Claims, 11 Drawing Sheets

(56) References Cited

U.S. PATENT DOCUMENTS

| | | | |
|---|---|---|---|
| 4,189,248 A | 2/1980 | Sully | |
| 4,565,350 A | 1/1986 | Rozek | |
| 4,593,430 A | 6/1986 | Spangler et al. | |
| 4,616,673 A | 10/1986 | Bondar | |
| 4,766,642 A | 8/1988 | Gaffney et al. | |
| 4,783,885 A | 11/1988 | Bory | |
| 4,794,945 A | 1/1989 | Reback | |
| 4,823,435 A | 4/1989 | Chappuis | |
| 4,842,009 A | 6/1989 | Reback | |
| 4,876,766 A | 10/1989 | Cohen | |
| 4,961,443 A | 10/1990 | Buccicone et al. | |
| 5,025,826 A | 6/1991 | Schoepe et al. | |
| 5,236,006 A * | 8/1993 | Platusich | F16K 5/0647 251/285 |
| 5,947,149 A | 9/1999 | Mark | |
| 6,438,771 B1 | 8/2002 | Donath et al. | |
| 7,108,012 B2 | 9/2006 | Rosko et al. | |
| 7,178,786 B2 * | 2/2007 | Turnau, III | F16K 31/60 251/309 |
| 7,628,173 B2 | 12/2009 | Rosko et al. | |
| 8,079,381 B2 | 12/2011 | Fischer et al. | |
| 8,231,318 B2 | 7/2012 | Pitsch et al. | |
| 8,381,759 B1 | 2/2013 | Chen | |
| 9,255,387 B2 | 2/2016 | Yang et al. | |
| 2005/0138726 A1 | 6/2005 | Daly | |
| 2006/0085908 A1 | 4/2006 | Daly | |
| 2011/0220827 A1 | 9/2011 | Tortorello et al. | |
| 2016/0138253 A1 | 5/2016 | Yang et al. | |
| 2018/0313067 A1 * | 11/2018 | Byron | F16K 31/60 |

FOREIGN PATENT DOCUMENTS

| | | |
|---|---|---|
| CN | 104565479 A | 4/2015 |
| CN | 104565749 A | 4/2015 |
| CN | 206234452 U | 6/2017 |
| EP | 2 218 950 A1 | 8/2010 |

OTHER PUBLICATIONS

Chinese Second Office Action on CN Appl. No. 201910406227.9 dated Apr. 2, 2021 (12 pages).

Chinese Third Office Action on CN Patent Application No. 201910406227.9 dated Sep. 10, 2021 (15 pages).

Corrected Notice of Allowance on U.S. Appl. No. 15/982,727 dated Jun. 25, 2020 (6 pages).

Foreign Action other than Search Report on non-Foley case related to U.S. Appl. No. 16/986,840 dated Sep. 10, 2021.

Non-Final Office Action on U.S. Appl. No. 15/982,727 dated Mar. 6, 2020 (4 pages).

Notice of Allowance on U.S. Appl. No. 15/982,727 dated May 27, 2020 (11 pages).

Preinterview First Office Action on U.S. Appl. No. 16/986,840 dated Oct. 29, 2021 (8 pages).

U.S. Notice of Allowance on U.S. Appl. No. 16/986,840 dated Feb. 2, 2022.

* cited by examiner

HANDLE CONNECTION SYSTEMS AND METHODS

CROSS-REFERENCE TO RELATED APPLICATIONS

The present Application is a Continuation of U.S. patent application Ser. No. 16/986,840, filed Aug. 6, 2020, which is a Divisional of, and claims the benefit of and priority to, U.S. patent application Ser. No. 15/982,727, filed May 17, 2018. The entire disclosures of U.S. patent application Ser. No. 16/986,840 and U.S. patent application Ser. No. 15/982,727 are incorporated herein by reference.

BACKGROUND

The present application relates generally to handle connection systems and methods. In particular, this application relates to systems and methods for connecting a handle to a yoke in a faucet.

Generally speaking, a faucet may include handles which are attached through intermediate components to a valve stem such that rotation of the handle causes rotation of the valve stem. These handles are typically retained relative to the valve stem through an interaction with a plumbing connection or surface. For example, the handle may be fastened to an intermediate component which is connected to a valve stem of a valve. As a result of such arrangements, it is often difficult to remove or service the valves. For example, the handle may have to be unfastened and removed before the valve can be removed from the valve body. Additionally, the handle may include an aperture through which the fastener is positioned. Even if this aperture is plugged, an aesthetic quality of the handle is decreased due to the fastener (e.g., an uninterrupted surface of the handle is interrupted by the aperture, fastener, or plug, etc.).

SUMMARY

One embodiment of the present disclosure is related to a faucet. The faucet includes a handle and a handle connection system. The handle includes an opening and a handle annular projection at least partially extending about the opening. The handle connection system is configured to be partially contained within the opening, threadably coupled to a yoke, and selectively coupled to the handle annular projection. The handle connection system is configured to facilitate rotation of the handle relative to the yoke while the handle connection system is threadably coupled to the yoke.

Another embodiment of the present disclosure is related to a faucet. The faucet includes a handle, a handle connection system, and a valve cartridge. The handle includes an opening, a recess, and a handle annular projection. The recess is positioned within the opening. The handle annular projection at least partially extends about the opening. The handle connection system is partially contained within the opening, positioned around a yoke, and selectively coupled to the handle annular projection. The valve cartridge includes a valve stem. The valve cartridge is received within the yoke and partially contained within the handle. The handle connection system facilitates rotation of the handle relative to the yoke. The recess is rotatably coupled to the valve stem such that rotation of the handle is transferred to the valve stem. The recess is not axially coupled to the valve stem.

Yet another embodiment of the present disclosure is related to a faucet. The faucet includes a handle, a handle connection system, and a valve cartridge. The handle includes an opening, a recess, and a handle annular projection. The recess is positioned within the opening. The handle annular projection at least partially extends about the opening. The handle connection system is partially contained within the opening, positioned around a yoke, and selectively coupled to the handle annular projection. The handle connection system includes a handle connection system annular channel at least partially extending about the handle connection system. The valve cartridge includes a valve stem. The valve cartridge is received within the yoke and partially contained within the handle. The handle connection system facilitates rotation of the handle relative to the yoke. The recess is rotatably coupled to the valve stem such that rotation of the handle is transferred to the valve stem. The handle connection system annular channel receives the handle annular projection to couple the handle connection system to the handle annular projection.

It is to be understood that both the foregoing general description and the following detailed description are exemplary and explanatory only and are not restrictive of the invention as claimed.

DETAILED DESCRIPTION

Figure 1:
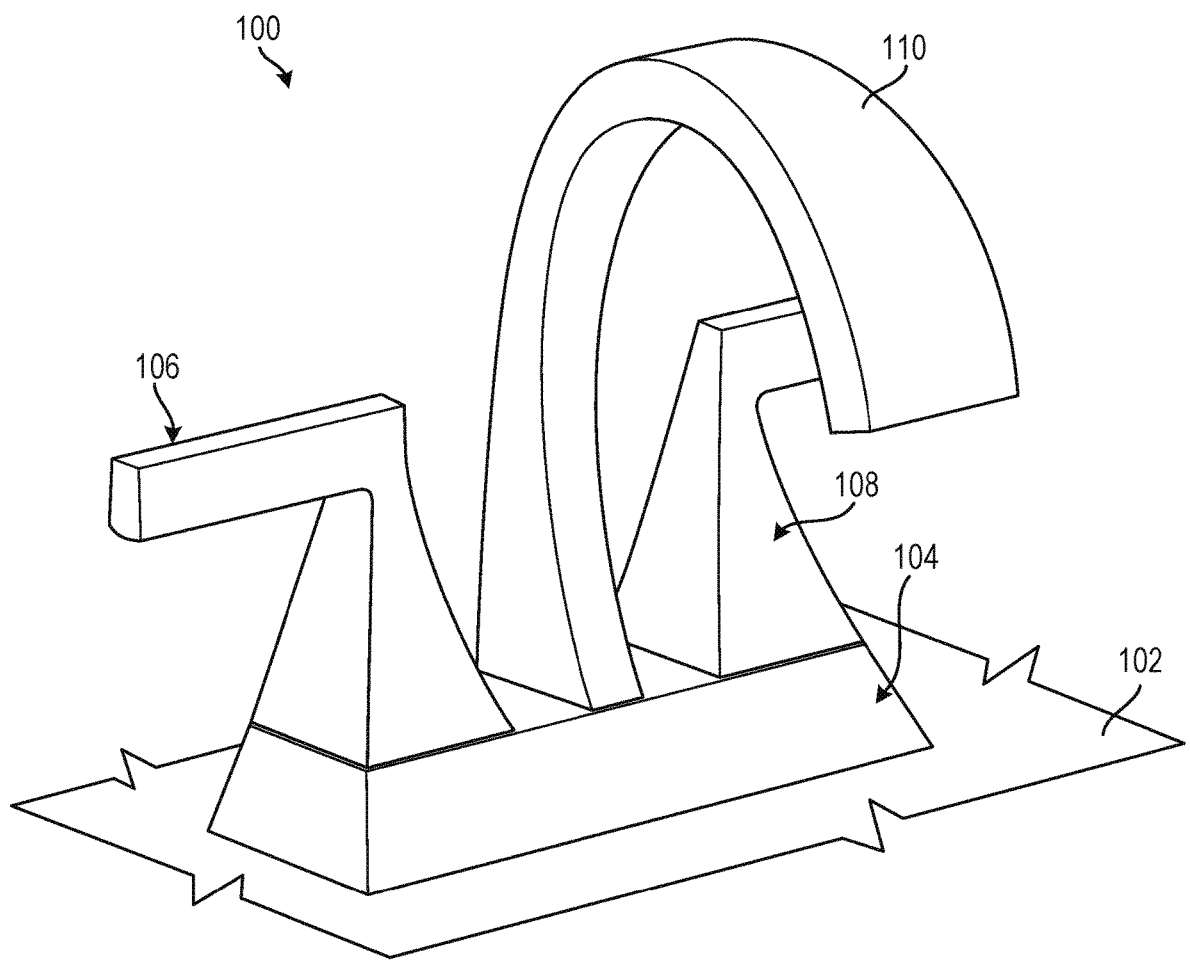
FIG. 1 is a perspective view of a faucet including an internal handle connection system, according to an exemplary embodiment of the present disclosure.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

I. Overview

A faucet may include handles for controlling a flow of water out of the faucet. The handles are attached to valves within the faucet which selectively open and close to control the flow of water out of the faucet. Over time, it may be desirable to service or replace these valves. To service or replace a valve in such a faucet, the handle must be removed. Typically, the handles are attached to the underlying structure of a faucet using fasteners which must be removed in order to remove the handle and service or replace the valve. The handles typically include holes within which the fasteners are positioned and into which a head of a tool (e.g., screwdriver, etc.) is inserted to remove the fastener. These holes interrupt the external surface of the handles, causing the handles to have a less that desirable aesthetic quality. Additionally, these holes may become filled with grime or serve as points through which water may travel into and out of the handle.

Some faucets include removable plugs to cover these holes. However, even with the use of these plugs, the handles still have a less than desirable aesthetic quality because the plugs still interrupt the exterior surface of the handles. These plugs can become dislodged, represent an added cost for a manufacturer of the faucet, and add difficulty in servicing or replacing the valves.

An additional shortcoming of these faucets is that a gap between the handle and an escutcheon is difficult to control over the life of the faucet. When this gap becomes too large, the handle can become wobbly or otherwise difficult to rotate in a consistent manner. Some faucets include friction washers positioned between the handle and the escutcheon. However, these washers represent an added cost for manufacturers of these faucets.

Various embodiments herein relate to a faucet that includes a handle connection structure which facilitates coupling of a handle to an underlying structure of the faucet without the use of a fastener coupling the handle directly to the underlying structure. Instead, the handle connection structure facilitates tool-less coupling and uncoupling of the handle to the underlying structure through the interaction between various annular projections and annular channels in the handle and the handle connection structure. The embodiments described herein facilitate simple and quick service or replacement of valves with handles that have an uninterrupted exterior surface and therefore an optimal aesthetic quality. Additionally, the embodiments described herein utilize the handle connection structure to maintain spacing between the handle and an escutcheon, thereby ensuring that the handle will consistently rotate in a desirable fashion (e.g., without wobble, etc.) and eliminating the need for the use of a friction washer.

II. The Faucet Including an Internal Handle Connection System

Referring to FIG. 1 a faucet (e.g., centerset faucet, sink faucet, bathroom faucet, etc.), shown as a faucet 100, is illustrated. The faucet 100 is configured to receive water (e.g., from a water supply pipe, etc.) and to selectively provide the water such that the water may be used to, for example, wash a user's hands. In various embodiments, the faucet 100 separately receives a first water stream (e.g., hot water, etc.) and a second water stream (e.g., cold water, etc.) and is configured to provide a third water stream that is a user-defined mixture of the first water stream and the second water stream. In this way, a user may alter a temperature and/or flow rate (e.g., volumetric flow rate, etc.) of the third water stream.

The faucet 100 is mounted on a surface (e.g., countertop, deck, etc.), shown as a surface 102. In various embodiments, the surface 102 is a bathroom countertop such that the faucet 100 is capable of being utilized in a bathroom. The faucet 100 includes a base (e.g., mount, plate, deck plate, etc.), shown as an escutcheon 104. The escutcheon 104 is mounted flush against the surface 102 such that substantially no gap exists between the escutcheon 104 and the surface 102. The escutcheon 104 may be secured to the surface 102 through an interaction between the escutcheon 104 and fasteners (e.g., screws, bolts, self-threading screws, threaded screws, etc.) which extend through the surface 102.

The faucet 100 also includes a handle (e.g., arm, etc.), shown as a first handle 106. As will be explained in more detail herein, the first handle 106 is coupled to a yoke, which is positioned within the escutcheon 104, through an internal handle connection system such that the first handle 106 is held in confronting relation with (e.g., adjacent to, proximate to, etc.) the surface 102. As will also be explained in more detail herein, the first handle 106 is rotatably coupled to a valve stem of a valve cartridge such that rotation of the first handle 106 causes corresponding rotation of the valve stem. By rotating the valve stem, the first handle 106 controls an amount of water from a stream of water that is provided from the faucet 100. In this way, the first handle 106 controls one of two valve cartridges in the faucet 100.

The faucet 100 also includes a handle, shown as a second handle 108. As will be explained in more detail herein, the second handle 108 is coupled to a yoke, which is positioned within the escutcheon 104, through an internal handle connection system such that the second handle 108 is held in confronting relation with (e.g., adjacent to, proximate to, etc.) the surface 102. As will also be explained in more detail herein, the second handle 108 is rotatably coupled to a valve stem of a valve cartridge such that rotation of the second handle 108 causes corresponding rotation of the valve stem. By rotating the valve stem, the second handle 108 controls an amount of water from a stream of water that is provided from the faucet 100. In this way, the second handle 108 controls the other of two valve cartridges in the faucet 100.

The faucet 100 also includes a spout (e.g., water providing structure, etc.), shown as a spout 110. The spout 110 may be coupled to the escutcheon 104 or structurally integrated with the escutcheon 104. The spout 110 is configured to receive a first water stream from the valve cartridge controlled by the first handle 106 and a second water stream from the valve cartridge controlled by the second handle 108 and to provide a mixed stream of water from the faucet 100 (e.g., for use in washing a user's hands, etc.).

As will be explained in greater detail herein, the first handle 106 and the second handle 108 are configured to have an uninterrupted and continuous external surface, thereby provided a superior aesthetic quality compared to handles which are fastened to underlying components. By utilizing the internal handle connection system described herein, the first handle 106 and the second handle 108 are configured to be coupled to a yoke without the use of a fastener protruding through the first handle 106 or the second handle 108. As a result, the external surfaces of the first handle 106 and the second handle 108 are not interrupted by a hole, within which a fastener would be positioned, or a plug (e.g., cap, etc.) covering such a hole.

In various embodiments, the escutcheon 104, the first handle 106, the second handle 108, and the spout 110 have matching exterior surfaces such that the faucet 100 attains a desirable aesthetic quality. For example, the escutcheon 104, the first handle 106, the second handle 108, and the spout 110 may have chrome exterior surfaces, brushed exterior surfaces (e.g., brushed aluminum, etc.), oil rubbed exterior surfaces (e.g. oil rubbed bronze, etc.), and other similar exterior surfaces. In various embodiments, the escutcheon 104, the first handle 106, the second handle 108, and the spout 110 are constructed from the same material. For example, the escutcheon 104, the first handle 106, the second handle 108, and the spout 110 may be constructed from aluminum, bronze, stainless steel, ceramic material, plastic (e.g., thermoplastic, polymer, etc.), and other similar materials.

III. The Faucet According to a First Exemplary Embodiment

Figure 2:
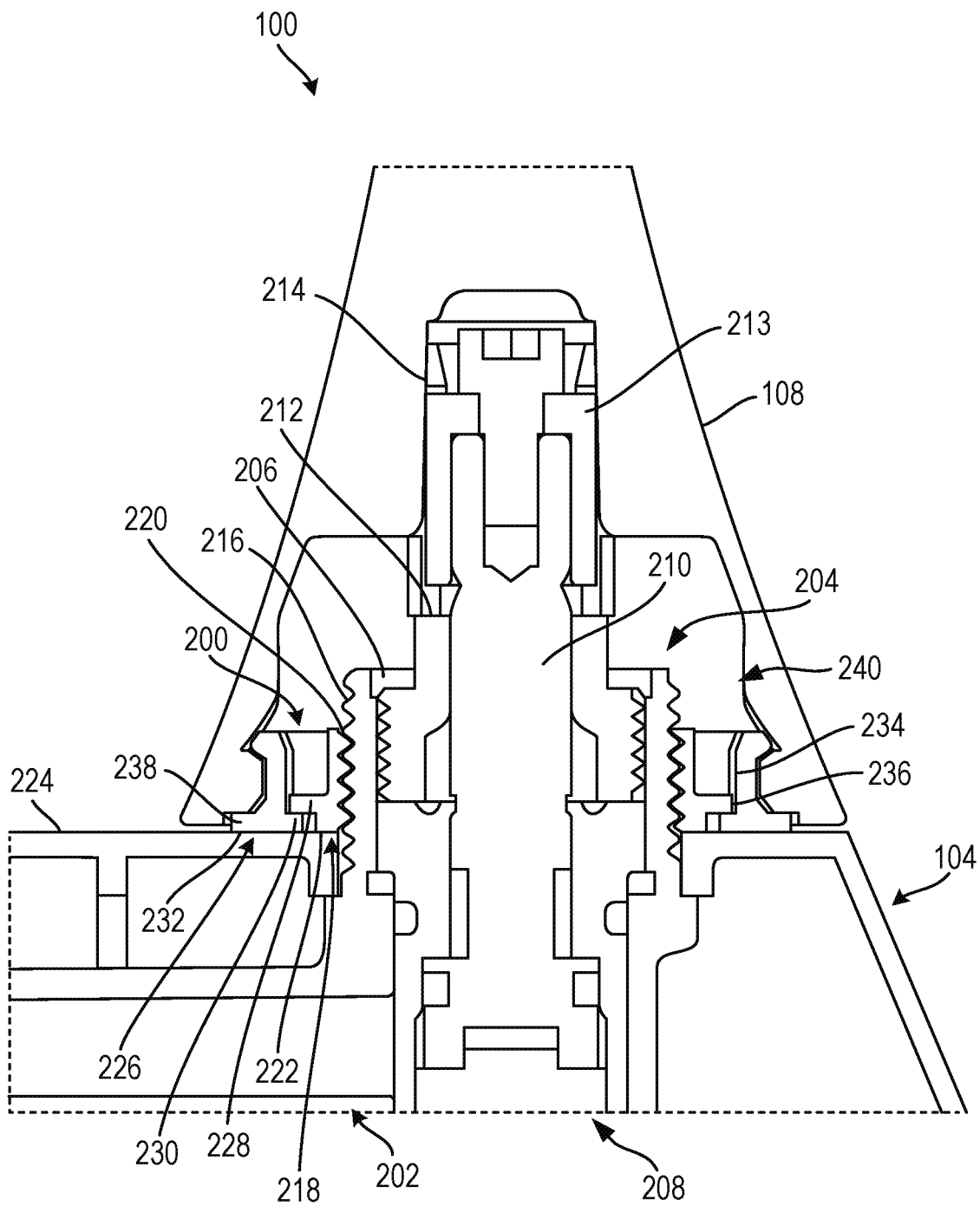
FIG. 2 is a cross-sectional view of a faucet including an internal handle connection system, according to an exemplary embodiment of the present disclosure.
Figure 3:
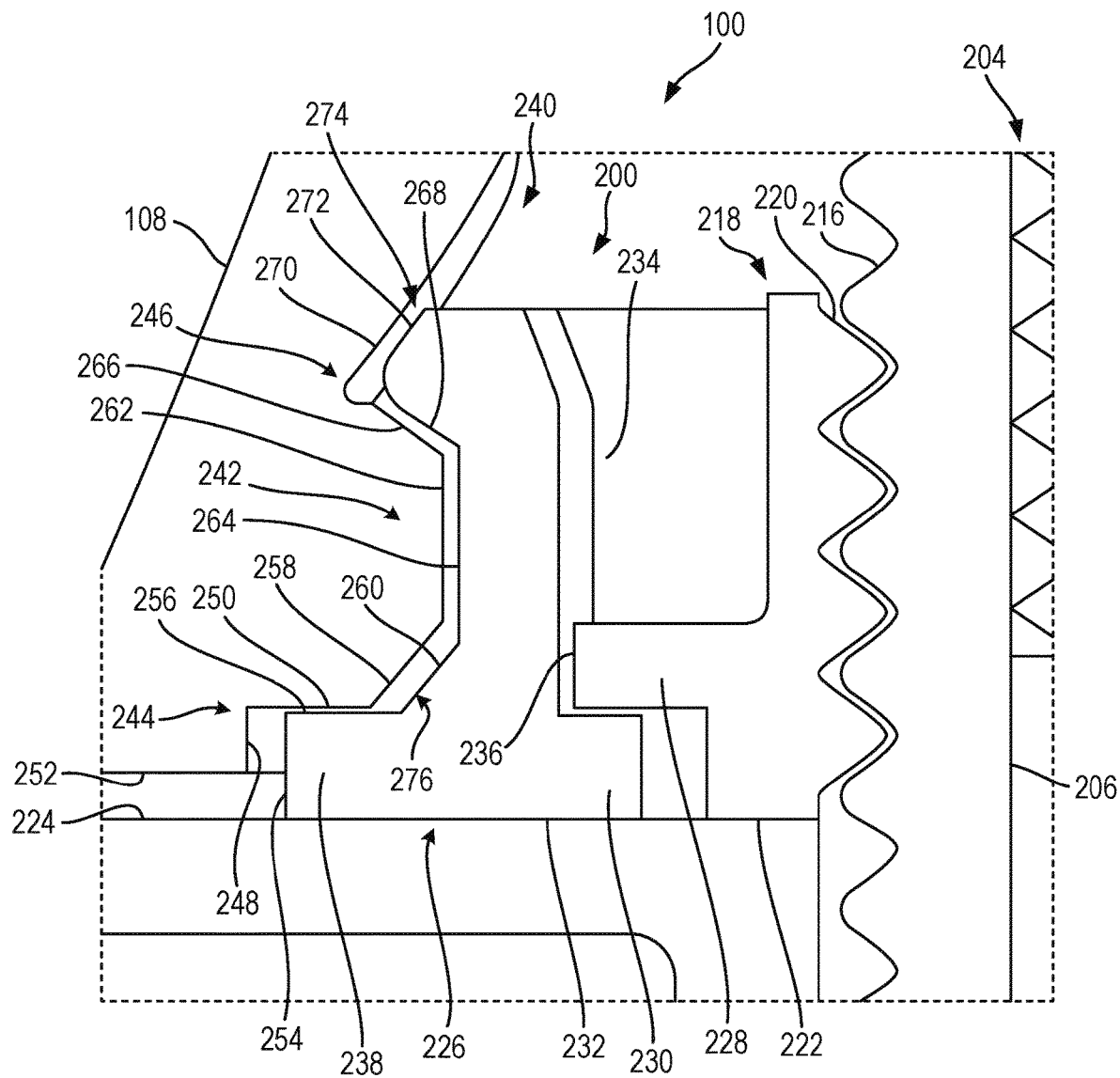
FIG. 3 is a detailed view of the cross-sectional view shown in FIG. 2.

FIGS. 2 and 3 illustrate the faucet 100 according to a first exemplary embodiment. The faucet 100 includes a structure (e.g., handle connection system, assembly, mechanism, etc.), shown as an internal handle connection system 200. The internal handle connection system 200 is configured to couple a handle (e.g., the first handle 106, the second handle 108, etc.), shown in FIGS. 2 and 3 as the second handle 108, to a yoke (e.g., plumbing component, plumbing conduit, etc.), shown as a yoke 202. The yoke 202 is configured to selectively provide a stream of water from an input end of the yoke 202 to the spout 110.

The yoke 202 protrudes through the surface 102 (not shown) and extends underneath the escutcheon 104. The yoke 202 includes a fitting (e.g., extension, protrusion, etc.), shown as a fitting 204, protruding from the yoke 202 through the escutcheon 104. The fitting 204 defines an aperture (e.g., opening, etc.), shown as an aperture 206. In various embodiments, the aperture 206 is of a standardized size.

The faucet 100 includes a valve (e.g., valve assembly, ¼ turn valve, etc.), shown as a valve cartridge 208. The valve cartridge 208 is configured to control the flow of a stream of water through the yoke 202 to the spout 110. The valve cartridge 208 is positioned within the aperture 206. The valve cartridge 208 includes a stem (e.g., post, etc.), shown as a valve stem 210. Rotation of the valve stem 210 controls the flow of a stream of water through the yoke 202 to the spout 110.

The faucet 100 includes a member (e.g., component, part, etc.), shown as a cap 212. The cap 212 is configured to be received over the valve stem 210 and within the aperture 206. In an exemplary embodiment, the aperture 206 includes a threaded portion and the cap 212 includes a threaded portion configured to interface with the threaded portion of the aperture 206. An interaction between the cap 212 and the aperture 206 is configured to retain the valve cartridge 208 within the aperture 206. The internal handle connection system 200 includes a member, shown as an engagement crown 213. The engagement crown 213 is configured to be coupled to the valve stem 210. In various embodiments, the engagement crown 213 is selectively fastened to the valve stem 210.

The second handle 108 includes a recess (e.g., depression, etc.), shown as a recess 214. The recess 214 is configured to receive the engagement crown 213 and transfer rotation of the second handle 108 to the valve stem 210 through the engagement crown 213. In this way, the second handle 108 is configured to control the flow of a stream of water through the yoke 202, via the valve cartridge 208, to the spout 110. In some embodiments, the shape of the recess 214 is selected to cooperate with the shape of the engagement crown 213. The recess 214 is not axially (e.g., along a center axis of the valve stem 210, etc.) coupled to the engagement crown 213. Specifically, axial movement of the handle 108 is not substantially impeded (e.g., resisted, etc.) by contact between the recess 214 and the engagement crown 213 such that a user may uncouple the second handle 108 from the internal handle connection system 200 by hand (e.g., without tools, etc.).

The fitting 204 includes a surface (e.g., external surface, etc.), shown as a first engagement surface 216. In various embodiments, at least a portion of the first engagement surface 216 is threaded. The internal handle connection system 200 includes a nut (e.g., collar, annular member, etc.), shown as a nut 218. The nut 218 includes a surface (e.g., internal surface, etc.), shown as a second engagement surface 220. In various embodiments, at least a portion of the second engagement surface 220 is threaded. The nut 218 is configured to be coupled to the yoke 202 through an interaction between the first engagement surface 216 and the second engagement surface 220. In an exemplary embodiment, the first engagement surface 216 threadably engages with the second engagement surface 220 to couple the nut 218 to the yoke 202. In other embodiments, the second engagement surface 220 and the first engagement surface 216 are otherwise engaged to couple the nut 218 to the yoke 202. Such other engagement may include a push-turn engagement (e.g., where the nut 218 includes a slot and the yoke 202 includes a protrusion configured to be received in the slot such that interaction between the protrusion and the slot causes the nut 218 to be coupled to the yoke 202, etc.).

The nut 218 includes a surface (e.g., bottom surface, etc.), shown as a first end face 222. The first end face 222 is contiguous with the second engagement surface 220. In various embodiments, the nut 218 is configured to be coupled to the yoke 202 such that the first end face 222 interfaces with (e.g., contacts, etc.) a surface, shown as a top surface 224, of the escutcheon 104. In other embodiments, the nut 218 is configured to be coupled to the yoke 202 such that the first end face 222 is spaced from (e.g., does not contact, etc.) the top surface 224.

The internal handle connection system 200 also includes a ring (e.g., collar, annular member, etc.), shown as a ring 226. The ring 226 is configured to interface with the nut 218 and the second handle 108 to couple the second handle 108 to the yoke 202. The ring 226 does not interface with the yoke 202 directly and is separated from the yoke 202 by the nut 218. Similarly, the nut 218 does not interface with the second handle 108 directly and is separated from the second handle 108 by the ring 226.

The nut 218 includes a flange (e.g., annular protrusion, etc.), shown as a first flange 228, extending radially outward from the nut 218 and away from the fitting 204. The ring 226 includes a flange, shown as a second flange 230, extending radially inward from the ring 226 and towards the fitting 204. The nut 218 and the ring 226 are configured such that the first flange 228 interfaces with the second flange 230 to bias the ring 226 against the escutcheon 104, thereby retaining the ring 226 relative to the fitting 204. Specifically, a second surface (e.g., bottom surface, etc.), shown as a second end face 232, of the ring 226 interfaces with the top surface 224. The second end face 232 of the ring 226 is contiguous with the second flange 230.

The ring 226 includes a surface, shown as an inner surface 234, which is proximate a surface, shown as a first outer surface 236, of the nut 218. In various embodiments, the inner surface 234 is spaced from the first outer surface 236. In these embodiments, the spacing (e.g., gap, play, etc.) between the inner surface 234 and the first outer surface 236 may be configured such that rotation of the ring 226 is not transferred to the nut 218. In other embodiments, the inner surface 234 interfaces with the first outer surface 236.

The ring 226 includes a flange, shown as a third flange 238, extending radially outward from the ring 226 and away from the fitting 204. The third flange 238 is contiguous with the second end face 232 of the ring 226. The third flange 238 is aligned with the second flange 230 such that the ring 226 is capable of resting on the top surface 224 with the second end face 232 flush with the top surface 224. The configuration of the third flange 238 (e.g., a thickness of the third flange 238, etc.) is selected such that a target gap is formed between the second handle 108 and the top surface 224. The target gap may be selected so as to facilitate optimal movement of the second handle 108 (e.g., without wobble of the second handle 108, etc.).

The second handle 108 includes an opening (e.g., hole, etc.), shown as an opening 240. The opening 240 extends from the recess 214 through a bottom end of the second handle 108. The opening 240 is configured to receive a portion of the fitting 204, a portion of the valve cartridge 208, a portion of the cap 212, a portion of the nut 218, and a portion of the ring 226. In this way, the opening 240 facilitates concealment of a portion of the fitting 204, a portion of the valve cartridge 208, a portion of the cap 212, a portion of the nut 218, and a portion of the ring 226 within the second handle 108.

The opening 240 includes a projection (e.g., protrusion, protuberance, etc.), shown as a handle annular projection 242 (e.g., a first annular projection, etc.). In various embodiments, the handle annular projection 242 extends continuously about the opening 240. In other embodiments, the handle annular projection 242 extends discontinuously about the opening 240 such that the handle annular projection 242 is formed from at least one discrete segment thereof. As will be explained in more detail herein, the handle annular projection 242 is configured to cooperate with the ring 226 to retain the second handle 108 relative to the fitting 204.

The opening 240 also includes a recess, shown as an annular recess 244. The annular recess 244 is contiguous with the handle annular projection 242 and configured to receive a portion of the ring 226. The opening 240 further includes a recess, shown as a handle annular channel 246 (e.g., a first annular channel, etc.). The handle annular channel 246 is contiguous with the handle annular projection 242 and configured to receive a portion of the ring 226. In various embodiments, the annular recess 244 and the handle annular channel 246 extend continuously about the opening 240. In other embodiments, the annular recess 244 and/or the handle annular channel 246 extend discontinuously about the opening 240 such that the annular recess 244 and/or the handle annular channel 246 is formed from at least one discrete segment thereof.

The annular recess 244 includes a surface, shown as a first annular surface 248, and a second surface, shown as a second annular surface 250. The first annular surface 248 is contiguous with a surface, shown as a third end face 252, of the second handle 108. In some embodiments, the first annular surface 248 is orthogonal to the second annular surface 250. Similarly, the third end face 252 is orthogonal to the first annular surface 248. The annular recess 244 is configured to receive a portion of the third flange 238. A portion of a surface, shown as a second outer surface 254, of the third flange 238 is in confronting relation with the first annular surface 248. For example, the second outer surface 254 may interface with the first annular surface 248. Similarly, a portion of a surface, shown as a third outer surface 256, of the third flange 238 is in confronting relation with the second annular surface 250. For example, the third outer surface 256 may interface with the second annular surface 250.

The handle annular projection 242 includes a surface, shown as a third annular surface 258. The third annular surface 258 is contiguous with the second annular surface 250. In various embodiments, the third annular surface 258 is obtusely angled relative to the second annular surface 250 (e.g., by one hundred and thirty degrees, by one hundred and forty five degrees, by one hundred and sixty degrees, etc.). The handle annular projection 242 is configured to be received in the ring 226 (e.g., the ring 226 is configured to receive the handle annular projection 242, etc.). At least a portion of a surface, shown as a fourth outer surface 260, of the ring 226 is in confronting relation with the third annular surface 258. For example, the fourth outer surface 260 may interface with the third annular surface 258. The fourth outer surface 260 is contiguous with the third outer surface 256. In various embodiments, the fourth outer surface 260 is obtusely angled relative to the third outer surface 256 (e.g., by one hundred and thirty degrees, by one hundred and forty five degrees, by one hundred and sixty degrees, etc.).

The handle annular projection 242 includes a surface, shown as a fourth annular surface 262. The fourth annular surface 262 is contiguous with the third annular surface 258. In various embodiments, the fourth annular surface 262 is reflexively angled relative to the third annular surface 258 (e.g., by two hundred degrees, by two hundred and fifteen degrees, by two hundred and thirty degrees, etc.). At least a portion of a surface, shown as a fifth outer surface 264, of the ring 226 is in confronting relation with the fourth annular surface 262. For example, the fifth outer surface 264 may interface with the fourth annular surface 262. The fifth outer surface 264 is contiguous with the fourth outer surface 260. In various embodiments, the fifth outer surface 264 is obtusely angled relative to the fourth outer surface 260 (e.g., by one hundred and thirty degrees, by one hundred and forty five degrees, by one hundred and sixty degrees, etc.).

The handle annular channel 246 includes a surface, shown as a fifth annular surface 266. The fifth annular surface 266 is contiguous with the fourth annular surface 262. In various embodiments, the fifth annular surface 266 is reflexively angled relative to the fourth annular surface 262 (e.g., by two hundred degrees, by two hundred and fifteen degrees, by two hundred and thirty degrees, etc.). At least a portion of a surface, shown as a sixth outer surface 268, of the ring 226 is in confronting relation with the fifth annular surface 266. For example, the sixth outer surface 268 may interface with the fifth annular surface 266. The sixth outer surface 268 is contiguous with the fifth outer surface 264. In various embodiments, the sixth outer surface 268 is obtusely angled relative to the fifth outer surface 264 (e.g., by one hundred and thirty degrees, by one hundred and forty five degrees, by one hundred and sixty degrees, etc.).

The handle annular channel 246 includes a surface, shown as a sixth annular surface 270. The sixth annular surface 270 is contiguous with the fifth annular surface 266. In various embodiments, the sixth annular surface 270 is angled (e.g., obtusely angled, acutely angled, right, orthogonal, etc.) relative to the fifth annular surface 266 (e.g., by one hundred degrees, by ninety five degrees, by ninety degrees, by eighty five degrees, etc.). At least a portion of a surface, shown as a seventh outer surface 272, of the ring 226 is in confronting relation with the sixth annular surface 270. The seventh outer surface 272 is contiguous with the sixth outer surface 268. In various embodiments, the seventh outer surface 272 is reflexively angled relative to the sixth outer surface 268

(e.g., by two hundred degrees, by two hundred and fifteen degrees, by two hundred and thirty degrees, etc.).

The ring 226 also includes a projection, shown as a handle connection system annular projection 274 (e.g., a second annular projection, etc.). The handle connection system annular projection 274 includes the sixth outer surface 268 and the seventh outer surface 272 and protrudes from the ring 226 away from the fitting 204. The handle connection system annular projection 274 is configured to be received in the handle annular channel 246. The handle connection system annular projection 274 and the third flange 238 cooperate to form a channel, shown as a handle connection system annular channel 276 (e.g., a second annular channel, etc.), therebetween. The handle connection system annular channel 276 includes the fifth outer surface 264 and the fourth outer surface 260.

Figure 4:
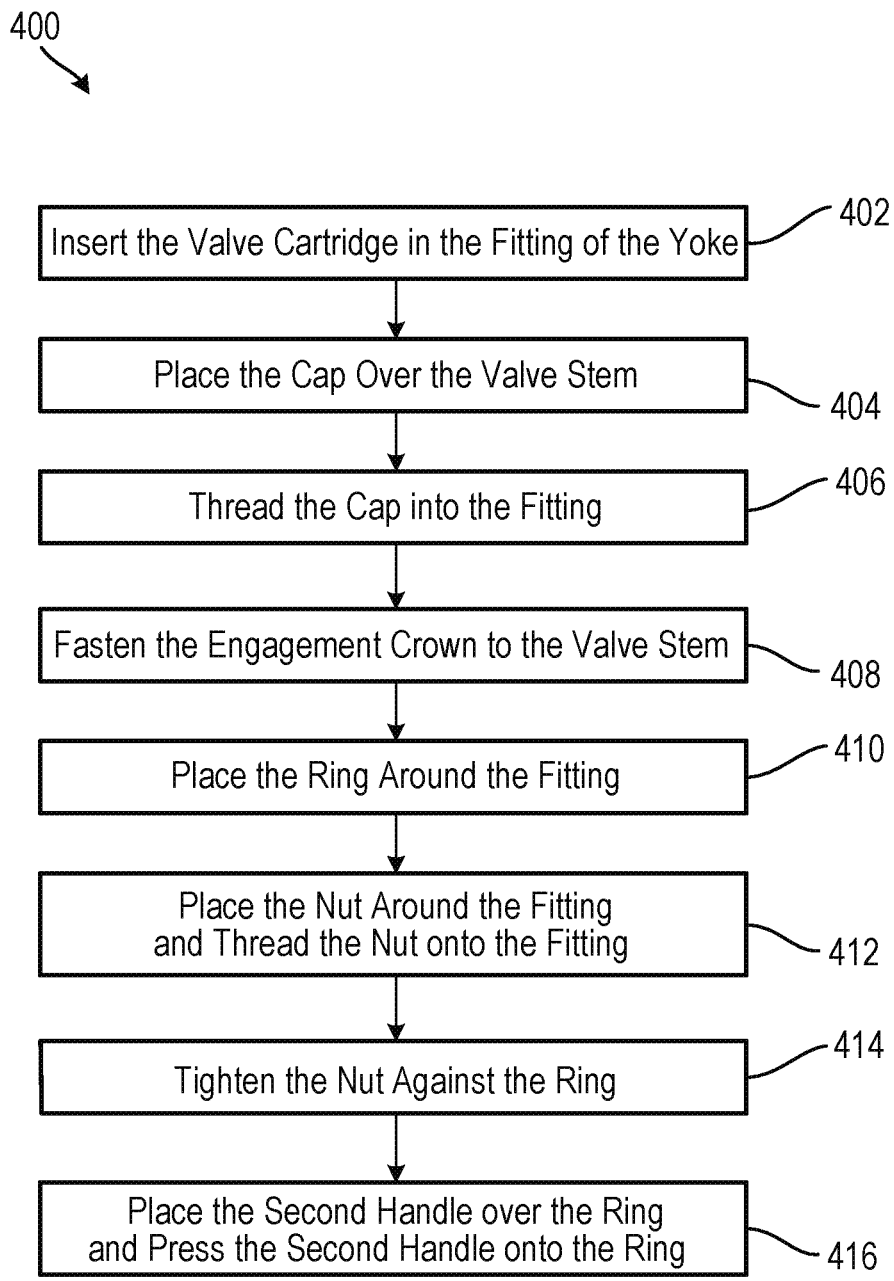
FIG. 4 is a flow chart for a process of installing a handle to the faucet shown in FIG. 2, according to an exemplary embodiment of the present disclosure.

FIG. 4 illustrates a process (e.g., method, etc.), shown as a process 400, for installing the valve cartridge 208 in the yoke 202 and subsequently coupling the second handle 108 to the yoke 202, such that the second handle 108 is configured to transfer rotation thereof to the valve cartridge 208 to control the flow of a water stream through the yoke 202.

The process 400 begins, in block 402, with inserting the valve cartridge 208 in the aperture 206 of the fitting 204 of the yoke 202. For example, the valve cartridge 208 may be removed from a package (e.g., retail package, etc.) and then pressed into the aperture 206. Then, in block 404, the cap 212 is placed over the valve stem 210. For example, the valve stem 210 may be inserted through a center aperture in the cap 212. In block 406, the cap 212 is threaded into the fitting 204. In this way, the cap 212 may bias the valve cartridge 208 against the yoke 202. In block 408, the engagement crown 213 is fastened to the valve stem 210. For example, the engagement crown 213 may be placed onto the valve stem 210 and a fastener may be threaded through the engagement crown 213 and into the valve stem 210.

In block 410, the ring 226 is placed around the fitting 204. For example, the ring 226 may be placed around the fitting 204 and against the top surface 224 of the escutcheon 104. In block 412, the nut 218 is placed around the fitting 204 and threaded onto the fitting 204. Specifically, the second engagement surface 220 of the nut 218 is threaded onto the first engagement surface 216 of the fitting 204. As the nut 218 is threaded onto the fitting 204, the nut 218 contacts the ring 226 and biases the ring 226 against the top surface 224. Specifically, the first flange 228 interfaces with the second flange 230 to bias the second end face 232 against the top surface 224. In block 414, the nut 218 is tightened against the ring 226. In this way, the ring 226 is secured against the escutcheon 104.

The process 400 continues with, in block 416, placing the second handle 108 over the ring 226 and pressing the second handle 108 onto the ring 226. The second handle 108 is positioned such that the recess 214 is aligned with the engagement crown 213, and the second handle 108 is pressed onto the ring 226. The second handle 108 is also pressed onto the ring 226 such that the handle annular projection 242 is received in the handle connection system annular channel 276 and the handle connection system annular projection 274 is received in the handle annular channel 246. Specifically, the third annular surface 258 contacts the seventh outer surface 272 and slides against the seventh outer surface 272. This contact causes the handle connection system annular projection 274 to be deflected inward towards the fitting 204 and/or the handle annular projection 242 to be deflected outward away from the fitting 204. In this way, the second handle 108 is capable of being coupled to the ring 226 without the use of a fastener (e.g., in a "tool-less" manner, etc.) that couples the second handle 108 to the ring 226.

While not shown in FIG. 4, it is understood that the process 400 may be reversed for uncoupling the second handle 108 from the ring 226. The second handle 108 may be uncoupled from the ring 226 when, for example, it is desired to service or replace the valve cartridge 208. To uncouple the second handle 108 from the ring 226, the second handle 108 is lifted from the escutcheon 104, causing the fifth annular surface 266 to contact the sixth outer surface 268 and slide against the sixth outer surface 268. This contact causes the handle connection system annular projection 274 to be deflected inward towards the fitting 204 and/or the handle annular projection 242 to be deflected outward away from the fitting 204. In this way, the second handle 108 is capable of being uncoupled to the ring 226 without the use of a fastener that couples the second handle 108 to the ring 226.

While FIGS. 2-4 describe the internal handle connection system 200 with reference to the second handle 108, it is understood that the faucet 100 includes a second internal connection structure, similar to the internal handle connection system 200, which couples the first handle 106 to the yoke 202.

IV. The Faucet According to a Second Exemplary Embodiment

Figure 5:
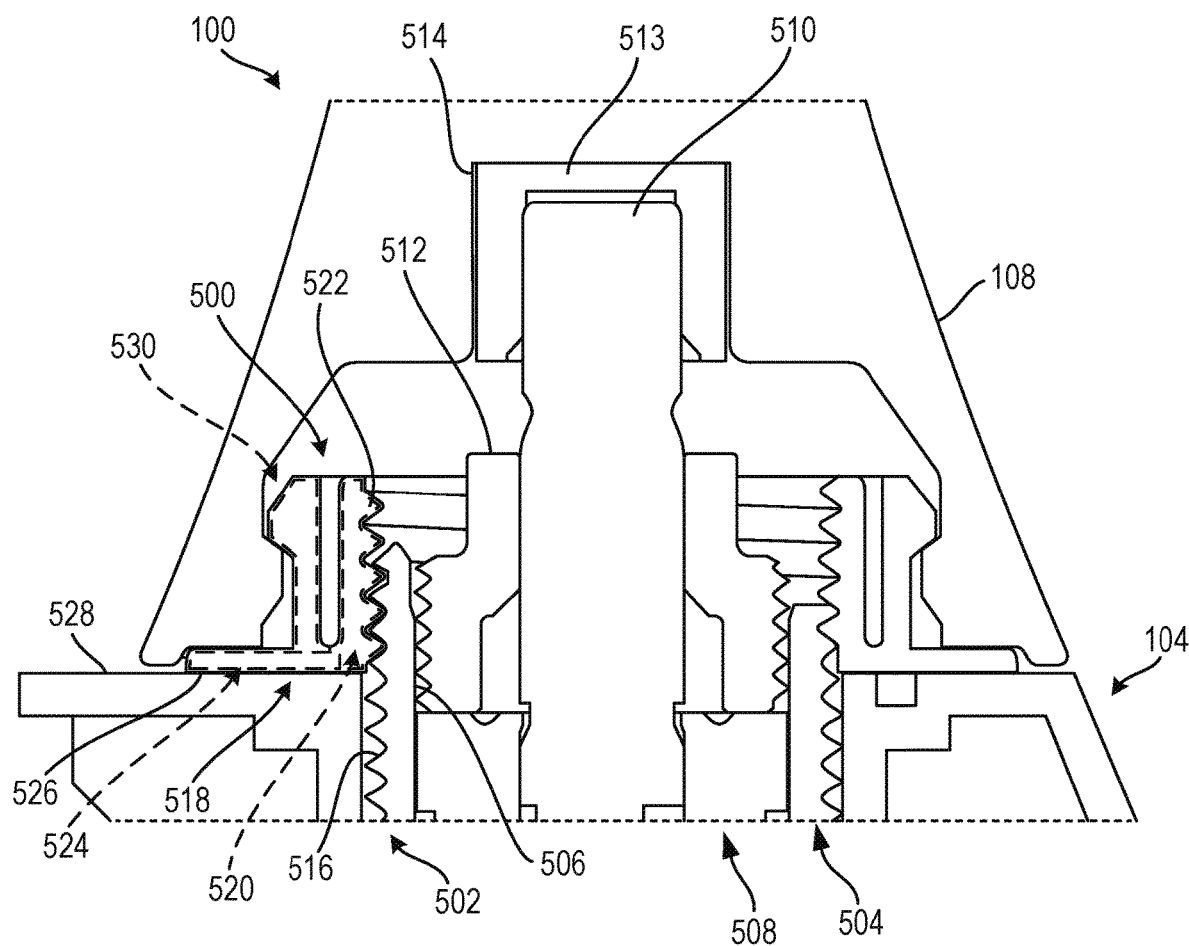
FIG. 5 is a cross-sectional view of a faucet including an internal handle connection system, according to an exemplary embodiment of the present disclosure.
Figure 6:
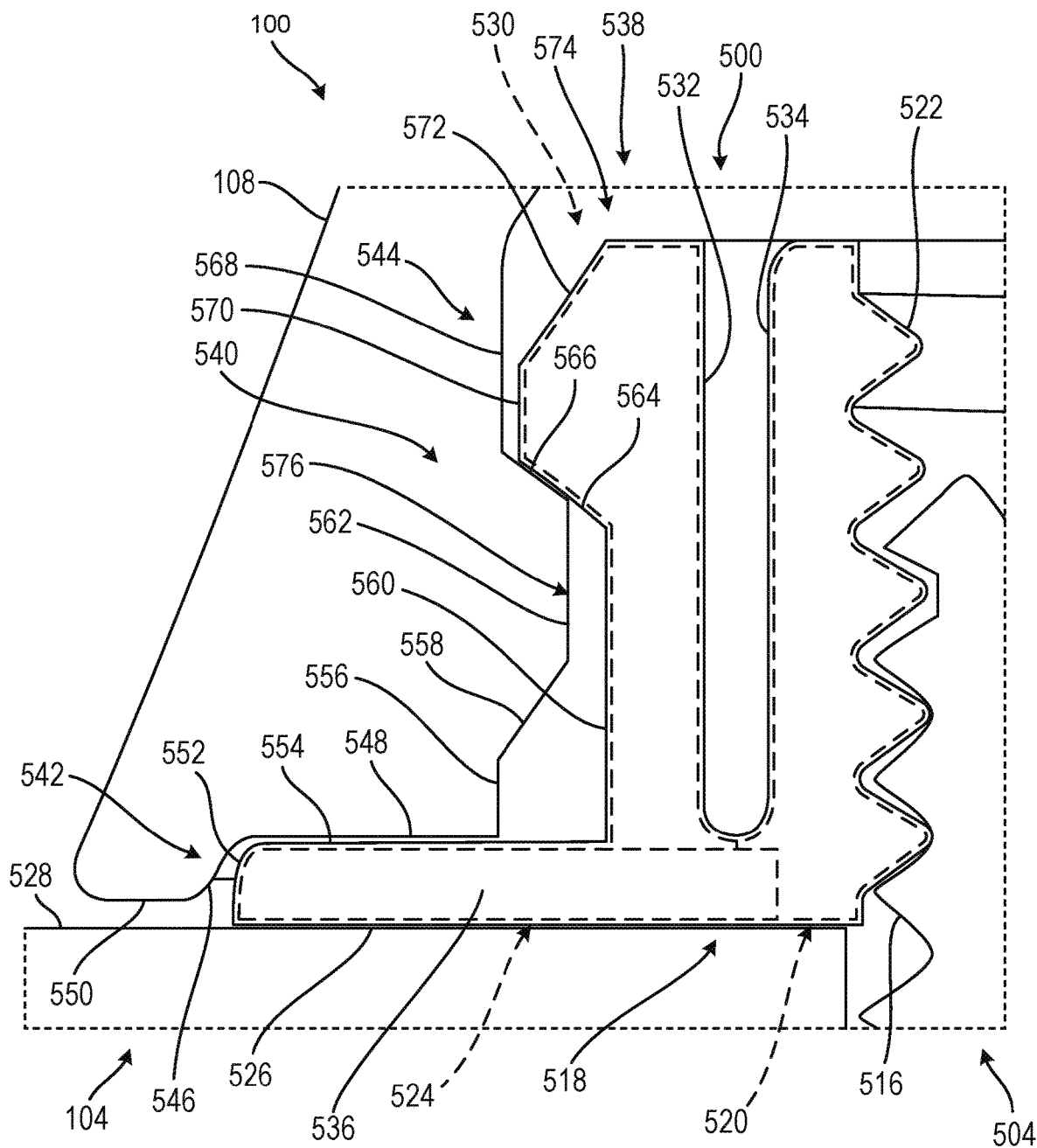
FIG. 6 is a detailed view of the cross-sectional view shown in FIG. 5.

FIGS. 5 and 6 illustrate the faucet 100 according to a second exemplary embodiment. The faucet 100 includes a structure, shown as an internal handle connection system 500. The internal handle connection system 500 is configured to couple a handle (e.g., the first handle 106, the second handle 108, etc.), shown in FIGS. 5 and 6 as the second handle 108, to a yoke, shown as a yoke 502. The yoke 502 is configured to selectively provide a stream of water from an input end of the yoke 502 to the spout 110.

The yoke 502 protrudes through the surface 102 (not shown) and extends underneath the escutcheon 104. The yoke 502 includes a fitting, shown as a fitting 504, protruding from the yoke 502 through the escutcheon 104. The fitting 504 defines an aperture, shown as an aperture 506. In various embodiments, the aperture 506 is of a standardized size.

The faucet 100 includes a valve, shown as a valve cartridge 508. The valve cartridge 508 is configured to control the flow of a stream of water through the yoke 502 to the spout 110. The valve cartridge 508 is positioned within the aperture 506. The valve cartridge 508 includes a stem, shown as a valve stem 510. Rotation of the valve stem 510 controls the flow of a stream of water through the yoke 502 to the spout 110.

The faucet 100 includes a member, shown as a cap 512. The cap 512 is configured to be received over the valve stem 510 and within the aperture 506. In an exemplary embodiment, the aperture 506 includes a threaded portion and the cap 512 includes a threaded portion configured to interface with the threaded portion of the aperture 506. An interaction between the cap 512 and the aperture 506 is configured to retain the valve cartridge 508 within the aperture 506. The internal handle connection system 500 includes a member, shown as an engagement crown 513. The engagement crown 513 is configured to be coupled to the valve stem 510. In various embodiments, the engagement crown 513 is selectively coupled to the valve stem 510. For example, the engagement crown 513 may be press fit onto the valve stem 510.

The second handle 108 includes a recess, shown as a recess 514. The recess 514 is configured to receive the engagement crown 513 and transfer rotation of the second handle 108 to the valve stem 510 through the engagement crown 513. In this way, the second handle 108 is configured to control the flow of a stream of water through the yoke 502, via the valve cartridge 508, to the spout 110. In some embodiments, the shape of the recess 514 is selected to cooperate with the shape of the engagement crown 513. The recess 514 is not axially (e.g., along a center axis of the valve stem 510, etc.) coupled to the engagement crown 513. Specifically, axial movement of the handle 108 is not substantially impeded by contact between the recess 514 and the engagement crown 513 such that a user may uncouple the second handle 108 from the internal handle connection system 500 by hand (e.g., without tools, etc.).

The fitting 504 includes a surface (e.g., external surface, etc.), shown as a first engagement surface 516. In various embodiments, at least a portion of the first engagement surface 516 is threaded. The internal handle connection system 500 includes a nut (e.g., collar, annular member, etc.), shown as a nut 518. The nut 518 is similar to both the nut 218 and the ring 226 previously described.

The nut 518 includes a portion, shown as a fitting portion 520. The fitting portion 520 is configured to interface with the fitting 504 to couple the nut 518 to the fitting 504. The fitting portion 520 includes a surface (e.g., internal surface, etc.), shown as a second engagement surface 522. In various embodiments, at least a portion of the second engagement surface 522 is threaded. The nut 518 is configured to be coupled to the yoke 502 through an interaction between the first engagement surface 516 and the second engagement surface 522. In an exemplary embodiment, the first engagement surface 516 threadably engages with the second engagement surface 522 to couple the nut 518 to the yoke 502. In other embodiments, the second engagement surface 522 and the first engagement surface 516 are otherwise engaged to couple the nut 518 to the yoke 502. Such other engagement may include a push-turn engagement (e.g., where the fitting portion 520 includes a slot and the yoke 502 includes a protrusion configured to be received in the slot such that interaction between the protrusion and the slot causes the nut 518 to be coupled to the yoke 502, etc.).

The nut 518 also includes a portion, shown as a support portion 524. The support portion 524 is configured to interface with the escutcheon 104 to support the nut 518 on the escutcheon 104 and to interface with the second handle 108 to support the second handle 108 on the escutcheon 104. The support portion 524 includes a surface (e.g., bottom surface, etc.), shown as a first end face 526. The first end face 526 is contiguous with the second engagement surface 522. The nut 518 is configured to be coupled to the yoke 502 such that the first end face 526 interfaces with (e.g., contacts, etc.) a surface, shown as a top surface 528, of the escutcheon 104. In various embodiments, the support portion 524 is configured to separate the second handle 108 from the top surface 528.

The nut 518 also includes a portion, shown as a handle portion 530. The handle portion 530 is configured to interface with the second handle 108 to couple the nut 518 to the second handle 108, and therefore to couple the second handle 108 to the yoke 502. The handle portion 530 does not interface with the yoke 502 directly and is separated from the yoke 502 by a gap and the fitting portion 520. Similarly, the fitting portion 520 does not interface with the second handle 108 directly and is separated from the second handle 108 by a gap and the handle portion 530. The fitting portion 520, the support portion 524, and the handle portion 530 are structurally integrated with each other. In an exemplary embodiment, the fitting portion 520 is contiguous with the support portion 524 and the handle portion 530 and the support portion 524 is also contiguous with the handle portion 530. As a result, the fitting portion 520, the support portion 524, and the handle portion 530 are configured to rotate simultaneously.

The handle portion 530 includes a surface, shown as an inner surface 532. The inner surface 532 is proximate and spaced from a surface, shown as a first outer surface 534, of the fitting portion 520. The support portion 524 includes a flange, shown as a flange 536, extending radially outward from the nut 518. The flange 536 is contiguous with the first end face 526 such that the nut 518 is capable of resting on the top surface 528 with the first end face 526 flush with the top surface 528. The configuration of the flange 536 (e.g., a thickness of the flange 536, etc.) is selected such that a target gap is formed between the second handle 108 and the top surface 528. The target gap may be selected so as to facilitate optimal movement of the second handle 108 (e.g., without wobble of the second handle 108, etc.).

The second handle 108 includes an opening, shown as an opening 538. The opening 538 extends from the recess 514 through a bottom end of the second handle 108. The opening 538 is configured to receive a portion of the fitting 504, a portion of the valve cartridge 508, a portion of the cap 512, and a portion of the nut 518. In this way, the opening 538 facilitates concealment of a portion of the fitting 504, a portion of the valve cartridge 508, a portion of the cap 512, and a portion of the nut 518 within the second handle 108.

The opening 538 includes a projection (e.g., protrusion, protuberance, etc.), shown as a handle annular projection 540 (e.g., a first annular projection, etc.). In various embodiments, the handle annular projection 540 extends continuously about the opening 538. In other embodiments, the handle annular projection 540 extends discontinuously about the opening 538 such that the handle annular projection 540 is formed from at least one discrete segment thereof. As will be explained in more detail herein, the handle annular projection 540 is configured to cooperate with the nut 518 to retain the second handle 108 relative to the fitting 504.

The opening 538 also includes a recess, shown as an annular recess 542. The annular recess 542 is configured to receive a portion of the nut 518. The opening 538 further includes a recess, shown as a handle annular channel 544 (e.g., a first annular channel, etc.). The handle annular channel 544 is contiguous with the handle annular projection 540 and configured to receive a portion of the nut 518. In various embodiments, the annular recess 542 and the handle annular channel 544 extend continuously about the opening 538. In other embodiments, the annular recess 542 and/or the handle annular channel 544 extend discontinuously about the opening 538 such that the annular recess 542 and/or the handle annular channel 544 is formed from at least one discrete segment thereof.

The annular recess 542 includes a surface, shown as a first annular surface 546, and a second surface, shown as a second annular surface 548. The first annular surface 546 is contiguous with a surface, shown as a second end face 550, of the second handle 108. In some embodiments, the first annular surface 546 is obtusely angled relative to the second annular surface 548 (e.g., by one hundred and thirty degrees, by one hundred and forty five degrees, by one hundred and sixty degrees, etc.). The second end face 550 is reflexively angled relative to the first annular surface 546 (e.g., by two hundred degrees, by two hundred and fifteen degrees, by two hundred and thirty degrees, etc.). The annular recess 542 is configured to receive a portion of the flange 536. A portion of a surface, shown as a second outer surface 552, of the flange 536 is in confronting relation with the first annular surface 546. For example, the second outer surface 552 may interface with the first annular surface 546. Similarly, a portion of a surface, shown as a third outer surface 554, of the flange 536 is in confronting relation with the second annular surface 548. For example, the third outer surface 554 may interface with the second annular surface 548.

The annular recess 542 is joined to the handle annular projection 540 along a surface, shown as a third annular surface 556. Specifically, the third annular surface 556 is contiguous with the second annular surface 548. In various embodiments, the third annular surface 556 is orthogonal to the second annular surface 548.

The handle annular projection 540 includes a surface, shown as a fourth annular surface 558. The fourth annular surface 558 is contiguous with the third annular surface 556. In various embodiments, the fourth annular surface 558 is obtusely angled relative to the second annular surface 548 (e.g., by one hundred and thirty degrees, by one hundred and forty five degrees, by one hundred and sixty degrees, etc.). The handle annular projection 540 is configured to be received in the nut 518 (e.g., the nut 518 is configured to receive the handle annular projection 540, etc.). At least a portion of a surface, shown as a fourth outer surface 560, of the nut 518 is proximate to the fourth annular surface 558. The fourth outer surface 560 is contiguous with the third outer surface 554. In various embodiments, the fourth outer surface 560 is orthogonal to the third outer surface 554. In this way, a gap may exist between the third annular surface 556, the fourth annular surface 558, the fourth outer surface 560, and the third outer surface 554. In some embodiments, a seal (e.g., O-ring, gasket, etc.) may be positioned within this gap to enhance sealing between the second handle 108 and the nut 518.

The handle annular projection 540 includes a surface, shown as a fifth annular surface 562. The fifth annular surface 562 is contiguous with the fourth annular surface 558. In various embodiments, the fifth annular surface 562 is reflexively angled relative to the fourth annular surface 558 (e.g., by two hundred degrees, by two hundred and fifteen degrees, by two hundred and thirty degrees, etc.). At least a portion of the fourth outer surface 560 is in confronting relation with the fifth annular surface 562. For example, the fourth outer surface 560 may interface with the fifth annular surface 562. Additionally, at least a portion of a surface, shown as a fifth outer surface 564, of the nut 518 is proximate that fifth annular surface 562. The fifth outer surface 564 is contiguous with the fourth outer surface 560. In various embodiments, the fifth outer surface 564 is obtusely angled relative to the fourth outer surface 560 (e.g., by one hundred and thirty degrees, by one hundred and forty five degrees, by one hundred and sixty degrees, etc.).

The handle annular channel 544 includes a surface, shown as a sixth annular surface 566. The sixth annular surface 566 is contiguous with the fifth annular surface 562. In various embodiments, the sixth annular surface 566 is reflexively angled relative to the fifth annular surface 562 (e.g., by two hundred degrees, by two hundred and fifteen degrees, by two hundred and thirty degrees, etc.). At least a portion of the fifth outer surface 564 is in confronting relation with the sixth annular surface 566. For example, the fifth outer surface 564 may interface with the sixth annular surface 566.

The handle annular channel 544 includes a surface, shown as a seventh annular surface 568. The seventh annular surface 568 is contiguous with the sixth annular surface 566. In various embodiments, the seventh annular surface 568 is angled (e.g., obtusely angled, acutely angled, right, orthogonal, etc.) relative to the sixth annular surface 566 (e.g., by one hundred degrees, by ninety five degrees, by ninety degrees, by eighty five degrees, etc.). At least a portion of a surface, shown as a sixth outer surface 570, of the nut 518 is in confronting relation with the seventh annular surface 568. For example, the sixth outer surface 570 may interface with the seventh annular surface 568. The sixth outer surface 570 is contiguous with the fifth outer surface 564. In various embodiments, the sixth outer surface 570 is reflexively angled relative to the fifth outer surface 564 (e.g., by two hundred degrees, by two hundred and fifteen degrees, by two hundred and thirty degrees, etc.).

The nut 518 also includes a surface, shown as a seventh outer surface 572. The seventh outer surface 572 is contiguous with the sixth outer surface 570. In various embodiments, the seventh outer surface 572 is angled (e.g., obtusely angled, acutely angled, right, orthogonal, etc.) relative to the sixth outer surface 570 (e.g., by one hundred degrees, by ninety five degrees, by ninety degrees, by eighty five degrees, etc.).

The nut 518 also includes a projection, shown as a handle connection system annular projection 574 (e.g., a second annular projection, etc.). The handle connection system annular projection 574 includes the fifth outer surface 564, the sixth outer surface 570, and the seventh outer surface 572 and protrudes from the nut 518 away from the fitting 504. The handle connection system annular projection 574 is configured to be received in the handle annular channel 544. The handle connection system annular projection 574 and the flange 536 cooperate to form a channel, shown as a handle connection system annular channel 576 (e.g., a second annular channel, etc.), therebetween. The handle connection system annular channel 576 includes the fourth outer surface 560.

Figure 7:
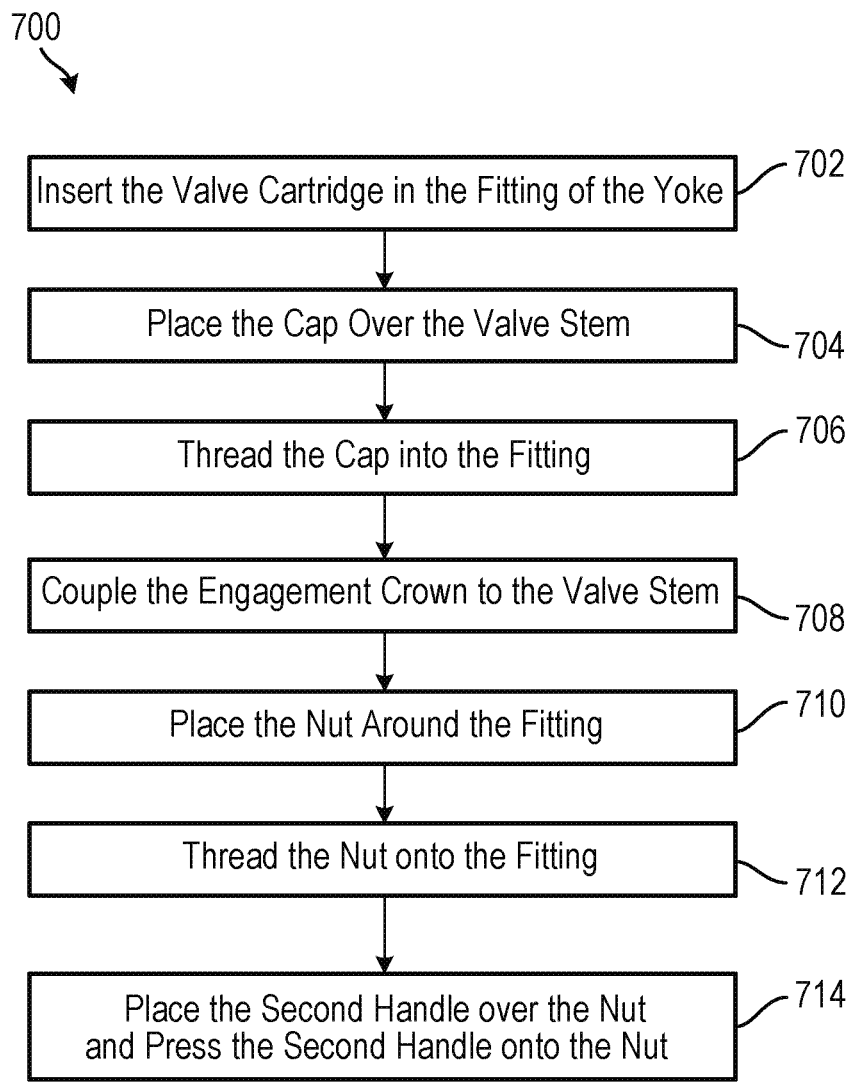
FIG. 7 is a flow chart for a process of installing a handle to the faucet shown in FIG. 5, according to an exemplary embodiment of the present disclosure.

FIG. 7 illustrates a process, shown as a process 700, for installing the valve cartridge 508 in the yoke 502 and subsequently coupling the second handle 108 to the yoke 502, such that the second handle 108 is configured to transfer rotation thereof to the valve cartridge 508 to control the flow of a water stream through the yoke 502.

The process 700 begins, in block 702, with inserting the valve cartridge 508 in the aperture 506 of the fitting 504 of the yoke 502. For example, the valve cartridge 508 may be removed from a package and then pressed into the aperture 506. Then, in block 704, the cap 512 is placed over the valve stem 510. For example, the valve stem 510 may be inserted through a center aperture in the cap 512. In block 706, the cap 512 is threaded into the fitting 504. In this way, the cap 512 may bias the valve cartridge 508 against the yoke 502. In block 708, the engagement crown 513 is coupled to the valve stem 510. For example, the engagement crown 513 may be pressed onto the valve stem 510.

In block 710, the nut 518 is placed around the fitting 504. For example, the nut 518 may be placed around the fitting 504 and against the top surface 528 of the escutcheon 104. In block 712, the nut 518 is threaded onto the fitting 504. Specifically, the second engagement surface 522 of the nut 518 is threaded onto the first engagement surface 516 of the fitting 504. As the nut 518 is threaded onto the fitting 504, the flange 536 is brought closer to the top surface 528 such that the flange 536 is biased against the top surface 528. In this way, the nut 518 is secured against the escutcheon 104.

The process 700 continues with, in block 714, placing the second handle 108 over the nut 518 and pressing the second handle 108 onto the nut 518. The second handle 108 is positioned such that the recess 514 is aligned with the engagement crown 513, and the second handle 108 is pressed onto the nut 518. The second handle 108 is also pressed onto the nut 518 such that the handle annular projection 540 is received in the handle connection system annular channel 576 and the handle connection system annular projection 574 is received in the handle annular channel 544. Specifically, the fifth annular surface 562 contacts the seventh outer surface 572 and slides against the seventh outer surface 572. This contact causes the handle connection system annular projection 574 to be deflected inward towards the fitting 504 and/or the handle annular projection 540 to be deflected outward away from the fitting 504. In this way, the second handle 108 is capable of being coupled to the nut 518 without the use of a fastener that couples the second handle 108 to the nut 518.

While not shown in FIG. 7, it is understood that the process 700 may be reversed for uncoupling the second handle 108 from the nut 518. The second handle 108 may be uncoupled from the nut 518 when, for example, it is desired to service or replace the valve cartridge 508. To uncouple the second handle 108 from the nut 518, the second handle 108 is lifted from the escutcheon 104, causing the sixth annular surface 566 to contact the fifth outer surface 564 and slide against the fifth outer surface 564. This contact causes the handle connection system annular projection 574 to be deflected inward towards the fitting 504 and/or the handle annular projection 540 to be deflected outward away from the fitting 504. In this way, the second handle 108 is capable of being uncoupled to the nut 518 without the use of a fastener that couples the second handle 108 to the nut 518.

While FIGS. 5-7 describe the internal handle connection system 500 with reference to the second handle 108, it is understood that the faucet 100 includes a second internal connection structure, similar to the internal handle connection system 500, which couples the first handle 106 to the yoke 502.

V. The Faucet According to a Third Exemplary Embodiment

Figure 8:
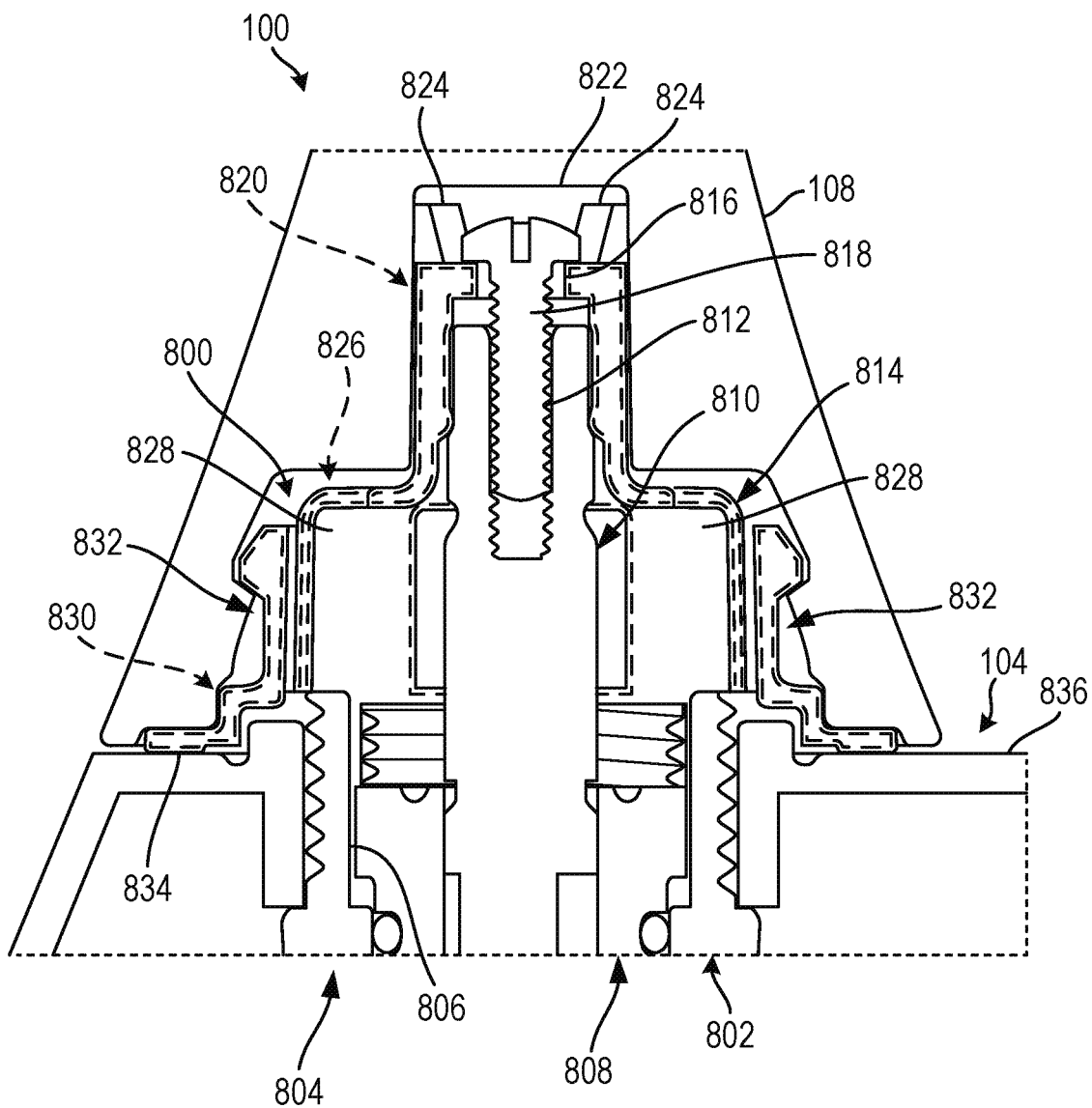
FIG. 8 is a cross-sectional view of a faucet including an internal handle connection system, according to an exemplary embodiment of the present disclosure.
Figure 9:
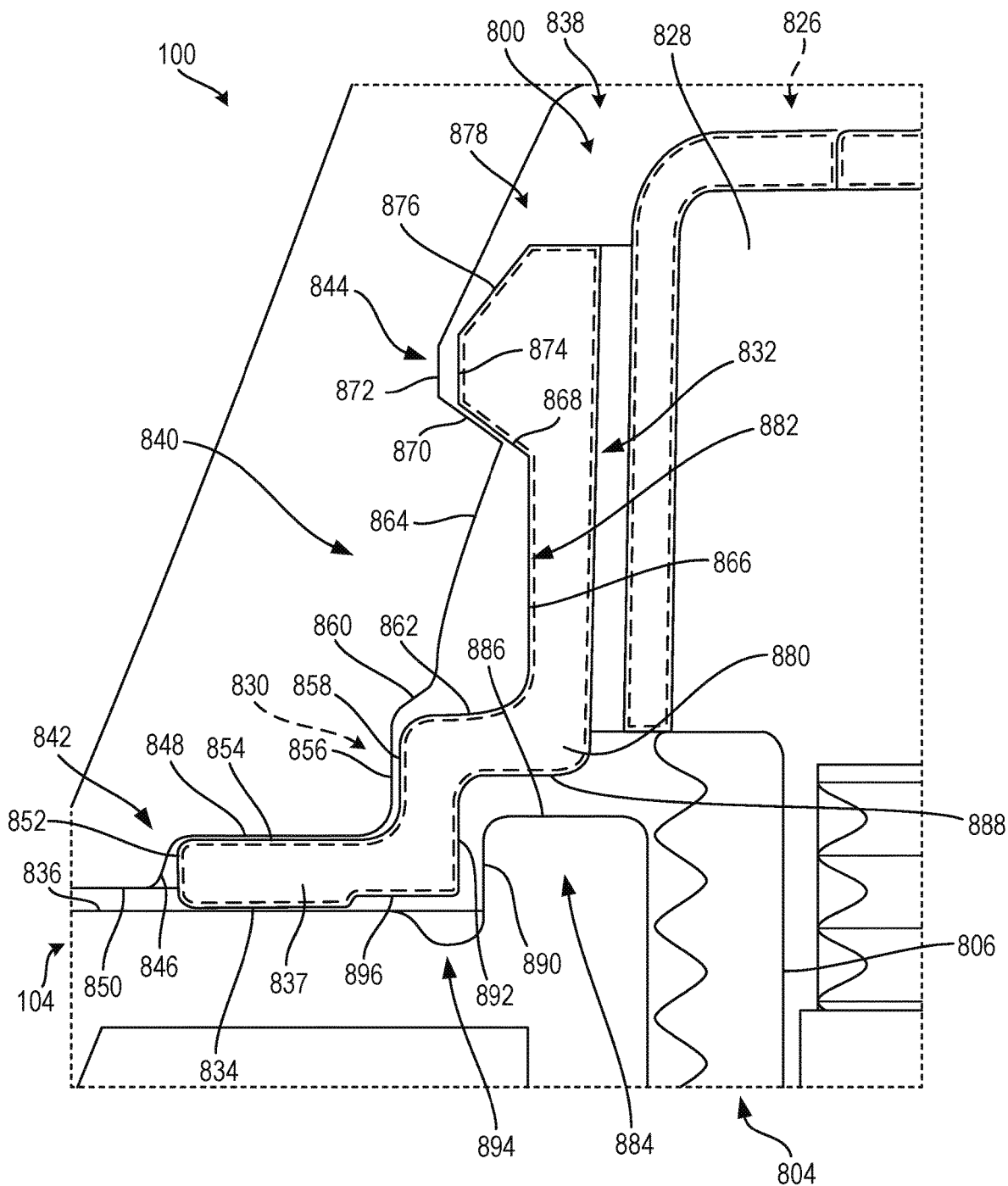
FIG. 9 is a detailed view of the cross-sectional view shown in FIG. 8.
Figure 10:
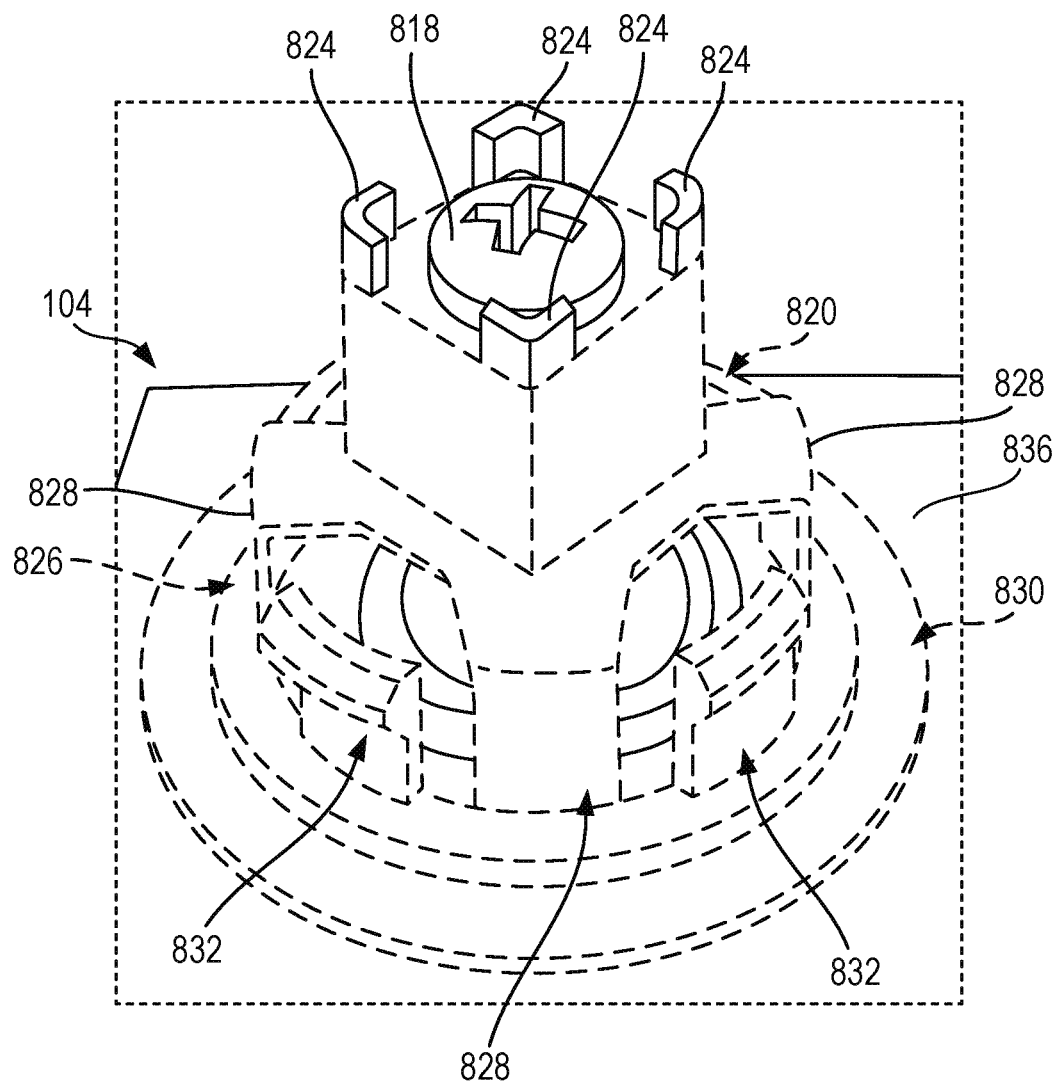
FIG. 10 is a top perspective view of a portion of the faucet shown in FIG. 8 with the second handle removed, according to an exemplary embodiment of the present disclosure.

FIGS. 8-10 illustrate the faucet 100 according to a third exemplary embodiment. The faucet 100 includes a structure, shown as an internal handle connection system 800. The internal handle connection system 800 is configured to couple a handle (e.g., the first handle 106, the second handle 108, etc.), shown in FIGS. 8 and 9 as the second handle 108, to a yoke, shown as a yoke 802. The yoke 802 is configured to selectively provide a stream of water from an input end of the yoke 802 to the spout 110.

The yoke 802 protrudes through the surface 102 (not shown) and extends underneath the escutcheon 104. The yoke 802 includes a fitting, shown as a fitting 804, protruding from the yoke 802 through the escutcheon 104. The fitting 804 defines an aperture, shown as an aperture 806. In various embodiments, the aperture 806 is of a standardized size.

The faucet 100 includes a valve, shown as a valve cartridge 808. The valve cartridge 808 is configured to control the flow of a stream of water through the yoke 802 to the spout 110. The valve cartridge 808 is positioned within the aperture 806. The valve cartridge 808 includes a stem, shown as a valve stem 810. Rotation of the valve stem 810 controls the flow of a stream of water through the yoke 802 to the spout 110. The valve stem 810 includes an aperture, shown as an aperture 812. The aperture 812 may be at least partially threaded.

The internal handle connection system 800 also includes a member, shown as an engagement crown 814. The engagement crown 814 is configured to be coupled to the valve stem 810. Specifically, the engagement crown 814 includes a hole, shown as a hole 816. The hole 816 is configured to receive a fastener, shown as a fastener 818, for coupling the engagement crown 814 to the valve stem 810. The fastener 818 extends through the hole 816 into the aperture 812. In various embodiments, the fastener 818 threadably engages the aperture 812.

The engagement crown 814 includes a first portion, shown as a stem portion 820. The stem portion 820 includes the hole 816 and the fastener 818 is configured to interface with the stem portion 820 to secure the engagement crown 814 to the valve stem 810. The second handle 108 includes a recess, shown as a recess 822. The recess 822 is configured to receive the stem portion 820. In various embodiments, the recess 822 and the stem portion 820 are configured to cooperate to transfer rotation of the second handle 108 to the valve stem 810 through the engagement crown 814. In this way, the second handle 108 may be configured to control the flow of a stream of water through the yoke 802, via the valve cartridge 808, to the spout 110. In some embodiments, the shape of the recess 822 is selected to cooperate with the shape of the stem portion 820. The recess 822 is not axially (e.g., along a center axis of the valve stem 810, etc.) coupled to the engagement crown 814. Specifically, axial movement of the handle 108 is not substantially impeded by contact between the recess 822 and the stem portion 820 such that a user may uncouple the second handle 108 from the internal handle connection system 800 by hand (e.g., without tools, etc.).

The stem portion 820 includes a plurality of projections, shown as tabs 824. The tabs 824 protrude from the stem portion 820, away from the valve stem 810 (e.g., upwards, away from the escutcheon 104, etc.), and are configured to interface with the recess 822. The tabs 824 are configured to mitigate backlash between the second handle 108 and the engagement crown 814 that occurs due to rotation of the second handle 108. Specifically, the tabs 824 mitigate play (e.g., slop, etc.) between the second handle 108 and the engagement crown 814. In an exemplary embodiment, all of the tabs 824 are identical.

The engagement crown 814 also includes a portion, shown as a connecting portion 826. The connecting portion 826 is contiguous with and structurally integrated with the stem portion 820. The connecting portion 826 includes a plurality of connectors, shown as connectors 828. The connectors 828 are each contiguous with the stem portion 820 and positioned such that gaps are formed between adjacent connectors 828.

The engagement crown 814 also includes a portion, shown as a ring portion 830. The ring portion 830 is contiguous with and structurally integrated with the connecting portion 826. In this way, the connectors 828 are configured to couple the ring portion 830 to the stem portion 820. As will be explained in more detail herein, the ring portion 830 is configured to be partially disposed between the second handle 108 and the escutcheon 104.

The ring portion 830 includes a plurality of projections, shown as lugs 832. The lugs 832 protrude from the ring portion 830 away from the escutcheon 104 (e.g., upwards, etc.). As will be explained in more detail herein, the lugs 832 are configured to couple the ring portion 830, and therefore the engagement crown 814, to the second handle 108. Each of the lugs 832 extends into one of the gaps between adjacent connectors 828. In an exemplary embodiment, the number of lugs 832 is equal to the number of connectors 828. As shown in FIGS. 8-10, the engagement crown 814 includes four lugs 832 and four connectors 828. In this way, the engagement crown 814 may be symmetrical about, for example, two orthogonal planes coincident with a central axis of the hole 816.

Unlike the nut 218 and the nut 518, the engagement crown 814 is not configured to be directly coupled to the yoke 802. Instead, the engagement crown 814 is coupled to the yoke 802 through an interaction with the fastener 818, the valve stem 810, and the valve cartridge 808. While not shown, the valve cartridge 808 may be retained in the yoke 802 using a cap, similar to the cap 212 and the cap 512 previously described.

The stem portion 820, the connecting portion 826, and the ring portion 830 are structurally integrated with each other. In an exemplary embodiment, the ring portion 830 is contiguous with the connecting portion 826 and the stem portion 820 is also contiguous with the connecting portion 826. As a result, the stem portion 820, the connecting portion 826, and the ring portion 830 are configured to rotate simultaneously.

The ring portion 830 includes a surface (e.g., bottom surface, etc.), shown as a first end face 834. The engagement crown 814 is configured to be coupled to the yoke 802 such that the first end face 834 interfaces with (e.g., contacts, etc.) a surface, shown as a top surface 836, of the escutcheon 104. In various embodiments, the ring portion 830 is configured to maintain separation of the second handle 108 and the top surface 836.

The ring portion 830 includes a flange, shown as a first flange 837, extending radially outward from the ring portion 830. The first flange 837 is contiguous with the first end face 834 such that the engagement crown 814 is capable of resting on the top surface 836 with the first end face 834 flush with the top surface 836. The configuration of the first flange 837 (e.g., a thickness of the first flange 837, etc.) is selected such that a target gap is formed between the second handle 108 and the top surface 836. The target gap may be selected so as to facilitate optimal movement of the second handle 108 (e.g., without wobble of the second handle 108, etc.).

The second handle 108 includes an opening, shown as an opening 838. The opening 838 extends from the recess 822 through a bottom end of the second handle 108. The opening 838 may be configured to receive a portion of the fitting 804 and is configured to receive a portion of the valve cartridge 808 and a portion of the engagement crown 814. In this way, the opening 838 facilitates concealment of a portion of the valve cartridge 808 and a portion of the engagement crown 814 within the second handle 108.

The opening 838 includes a projection (e.g., protrusion, protuberance, etc.), shown as a handle annular projection 840 (e.g., a first annular projection, etc.). In various embodiments, the handle annular projection 840 extends continuously about the opening 838. In other embodiments, the handle annular projection 840 extends discontinuously about the opening 838 such that the handle annular projection 840 is formed from at least one discrete segment thereof. As will be explained in more detail herein, the handle annular projection 840 is configured to cooperate with the engagement crown 814 to retain the second handle 108 relative to the fitting 804.

The opening 838 also includes a recess, shown as an annular recess 842. The annular recess 842 is configured to receive a portion of the ring portion 830. The opening 838 further includes a recess, shown as a handle annular channel 844 (e.g., a first annular channel, etc.). The handle annular channel 844 is contiguous with the handle annular projection 840 and configured to receive a portion of the engagement crown 814. In various embodiments, the annular recess 842 and the handle annular channel 844 extend continuously about the opening 838. In other embodiments, the annular recess 842 and/or the handle annular channel 844 extend discontinuously about the opening 838 such that the annular recess 842 and/or the handle annular channel 844 is formed from at least one discrete segment thereof.

The annular recess 842 includes a surface, shown as a first annular surface 846, and a second surface, shown as a second annular surface 848. The first annular surface 846 is contiguous with a surface, shown as a second end face 850, of the second handle 108. In some embodiments, the first annular surface 846 is obtusely angled relative to the second annular surface 848 (e.g., by one hundred and thirty degrees, by one hundred and forty five degrees, by one hundred and sixty degrees, etc.). The second end face 850 is reflexively angled relative to the first annular surface 846 (e.g., by two hundred degrees, by two hundred and fifteen degrees, by two hundred and thirty degrees, etc.). The annular recess 842 is configured to receive a portion of the first flange 837. A portion of a surface, shown as a first outer surface 852, of the first flange 837 is in confronting relation with the first annular surface 846. For example, the first outer surface 852 may interface with the first annular surface 846. Similarly, a portion of a surface, shown as a second outer surface 854, of the first flange 837 is in confronting relation with the second annular surface 848. For example, the second outer surface 854 may interface with the second annular surface 848.

The annular recess 842 is joined to the handle annular projection 840 along a surface, shown as a third annular surface 856. Specifically, the third annular surface 856 is contiguous with the second annular surface 848. In various embodiments, the third annular surface 856 is orthogonal to the second annular surface 848. At least a portion of a surface, shown as a third outer surface 858, of the ring portion 830 is proximate to the third annular surface 856. The third outer surface 858 is contiguous with the second outer surface 854. In various embodiments, the third outer surface 858 is orthogonal to the second outer surface 854.

The handle annular projection 840 includes a surface, shown as a fourth annular surface 860. The fourth annular surface 860 is contiguous with the third annular surface 856. In various embodiments, the fourth annular surface 860 is obtusely angled relative to the second annular surface 848 (e.g., by one hundred and five degrees, by one hundred degrees, by one hundred and twenty degrees, etc.). In other embodiments, the fourth annular surface 860 is orthogonal to the second annular surface 848. At least a portion of a surface, shown as a fourth outer surface 862, of the ring portion 830 is proximate to the fourth annular surface 860. The fourth outer surface 862 is contiguous with the third outer surface 858. In various embodiments, the fourth outer surface 862 is reflexively angled relative to the third outer surface 858.

The handle annular projection 840 is configured to be received in the engagement crown 814 (e.g., the engagement crown 814 is configured to receive the handle annular projection 840, etc.). Specifically, the lugs 832 are configured to receive the handle annular projection 840 such that the handle annular projection 840 is held proximate or against the fourth outer surface 862. The handle annular projection 840 includes a surface, shown as a fifth annular surface 864. The fifth annular surface 864 is contiguous with the fourth annular surface 860. In various embodiments, a portion of the fifth annular surface 864 adjoining the fourth annular surface 860 is reflexively angled relative to the fourth annular surface 860.

At least a portion of a surface, shown as a fifth outer surface 866, of the engagement crown 814 is proximate to the fifth annular surface 864. For example, the fifth outer surface 866 may interface with the fifth annular surface 864. The fifth outer surface 866 is disposed on each of the lugs 832. The fifth outer surface 866 is contiguous with the fourth outer surface 862. In various embodiments, the fifth outer surface 866 is orthogonal to the fourth outer surface 862. Additionally, at least a portion of a surface, shown as a sixth outer surface 868, of the engagement crown 814 is proximate that fifth annular surface 864. The sixth outer surface 868 is contiguous with the fifth outer surface 866. In various embodiments, the sixth outer surface 868 is obtusely angled relative to the fifth outer surface 866 (e.g., by one hundred and thirty degrees, by one hundred and forty five degrees, by one hundred and sixty degrees, etc.).

The handle annular channel 844 includes a surface, shown as a sixth annular surface 870. The sixth annular surface 870 is contiguous with the fifth annular surface 864. In various embodiments, the sixth annular surface 870 is reflexively angled relative to the fifth annular surface 864 (e.g., by two hundred degrees, by two hundred and fifteen degrees, by two hundred and thirty degrees, etc.). At least a portion of the sixth outer surface 868 is in confronting relation with the sixth annular surface 870. For example, the sixth outer surface 868 may interface with the sixth annular surface 870.

The handle annular channel 844 includes a surface, shown as a seventh annular surface 872. The seventh annular surface 872 is contiguous with the sixth annular surface 870. In various embodiments, the seventh annular surface 872 is angled (e.g., obtusely angled, acutely angled, right, orthogonal, etc.) relative to the sixth annular surface 870 (e.g., by one hundred degrees, by ninety five degrees, by ninety degrees, by eighty five degrees, etc.). At least a portion of a surface, shown as an seventh outer surface 874, of the engagement crown 814 is in confronting relation with the sixth annular surface 870. For example, the seventh outer surface 874 may interface with the sixth annular surface 870. The seventh outer surface 874 is contiguous with the sixth outer surface 868. In various embodiments, the seventh outer surface 874 is reflexively angled relative to the sixth outer surface 868 (e.g., by two hundred degrees, by two hundred and fifteen degrees, by two hundred and thirty degrees, etc.).

The engagement crown 814 also includes a surface, shown as a eighth outer surface 876. The eighth outer surface 876 is contiguous with the seventh outer surface 874. In various embodiments, the eighth outer surface 876 is angled (e.g., obtusely angled, acutely angled, right, orthogonal, etc.) relative to the seventh outer surface 874 (e.g., by one hundred degrees, by ninety five degrees, by ninety degrees, by eighty five degrees, etc.).

The lugs 832 each include a portion of a projection, shown as a handle connection system annular projection 878 (e.g., a second annular projection, etc.), which extends at least partially about the engagement crown 814. The handle connection system annular projection 878 includes the sixth outer surface 868, the seventh outer surface 874, and the eighth outer surface 876 and protrudes from each of the lugs 832 away from the fitting 804. The handle connection system annular projection 878 is configured to be received in the handle annular channel 844.

The ring portion 830 also includes a flange, shown as a second flange 880. The second flange 880 is contiguous with the fourth outer surface 862 such that the second handle 108, and specifically the fourth annular surface 860, is capable of resting on the second flange 880. The handle connection system annular projection 878 and the second flange 880 cooperate to form a channel, shown as a handle connection system annular channel 882 (e.g., a second annular channel, etc.), therebetween. The handle connection system annular channel 882 includes the fifth outer surface 866.

In the embodiments shown and described with reference to FIGS. 8-10, the escutcheon 104 is configured to selectively interface with the engagement crown 814 to prevent undesirable movement (e.g., wobble, slop, play, etc.) of the engagement crown 814 relative to the escutcheon 104. The escutcheon 104 includes a projection, shown as a stop 884. In various embodiments, the stop 884 extends continuously about the opening 838. In other embodiments, the stop 884 extends discontinuously about the opening 838 such that the stop 884 is formed from at least one discrete segment thereof.

The stop 884 includes a surface, shown as a first stop surface 886. The first stop surface 886 is generally parallel to, and offset from, the top surface 836. At least a portion of a surface, shown as a first bottom surface 888, of the engagement crown 814 is in confronting relation with the first stop surface 886. For example, the first bottom surface 888 may interface with the first stop surface 886. The first bottom surface 888 is part of the second flange 880. In various embodiments, the first bottom surface 888 is generally parallel to the fourth outer surface 862.

The stop 884 includes a surface, shown as a second stop surface 890. The second stop surface 890 is contiguous with the first stop surface 886. In various embodiments, the second stop surface 890 is reflexively angled relative to the first stop surface 886 (e.g., by two hundred degrees, by two hundred and fifteen degrees, by two hundred and thirty degrees, etc.). At least a portion of a surface, shown as a second bottom surface 892, of the engagement crown 814 is in confronting relation with the second stop surface 890. For example, the second bottom surface 892 may interface with the second stop surface 890. In various embodiments, the second bottom surface 892 is generally parallel to the third outer surface 858. The second bottom surface 892 is contiguous with the first bottom surface 888. In various embodiments, the second bottom surface 892 is orthogonal to the first bottom surface 888.

Interaction between the second bottom surface 892 and the second stop surface 890 inhibits further movement of the second bottom surface 892 towards the fitting 804. In this way, the stop 884 is capable of limiting undesirable movement of the second handle 108 because movement of the second handle 108 is tied to movement of the engagement crown 814.

The escutcheon 104 also includes a channel, shown as a valley 894. The valley 894 is contiguous with the second stop surface 890. In various embodiments, the valley 894 extends continuously about the opening 838. In other embodiments, the valley 894 extends discontinuously about the opening 838 such that the valley 894 is formed from at least one discrete segment thereof. The valley 894 is adjacent a surface, shown as a third bottom surface 896, of the engagement crown 814. The third bottom surface 896 is contiguous with the second bottom surface 892. The valley 894 is configured to form a gap between the engagement crown 814 and the escutcheon 104. Specifically, a gap may exist between the valley 894 and the third bottom surface 896. In some embodiments, a seal (e.g., O-ring, gasket, etc.) may be positioned within this gap to enhance sealing between the engagement crown 814 and the escutcheon 104.

Figure 11:
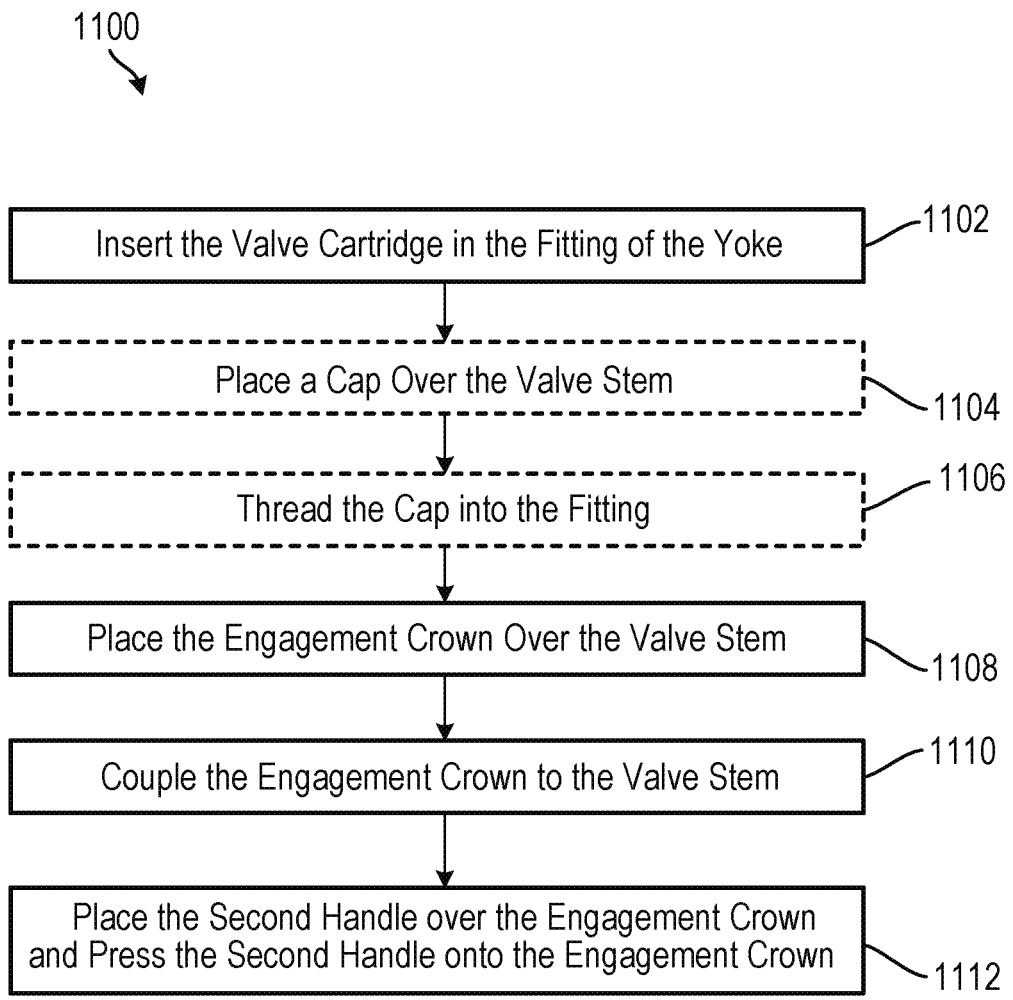
FIG. 11 is a flow chart for a process of installing a handle to the faucet shown in FIG. 8, according to an exemplary embodiment of the present disclosure.

FIG. 11 illustrates a process, shown as a process 1100, for installing the valve cartridge 808 in the yoke 802 and subsequently coupling the second handle 108 to the yoke 802, such that the second handle 108 is configured to transfer rotation thereof to the valve cartridge 808 to control the flow of a water stream through the yoke 802.

The process 1100 begins, in block 1102, with inserting the valve cartridge 808 in the aperture 806 of the fitting 804 of the yoke 802. For example, the valve cartridge 808 may be removed from a package and then pressed into the aperture 806. The process 1100 may include, in block 1104, placing a cap (e.g., the cap 512, etc.) over the valve stem 810. For example, the valve stem 810 may be inserted through a center aperture in the cap. The process 1100 may also include, in block 1106, threading the cap into the fitting 804. In this way, the cap may bias the valve cartridge 808 against the yoke 802.

In block 1108, the engagement crown 814 is placed over the valve stem 810. For example, the engagement crown 814 may be placed over the valve stem 810 such that the hole 816 is aligned with the aperture 812. Then, in block 1110, the engagement crown 814 is coupled to the valve stem 810. For example, the fastener 818 is inserted through the hole 816 and threaded into the aperture 812.

The process 1100 continues with, in block 1112, placing the second handle 108 over the engagement crown 814 and pressing the second handle 108 onto the engagement crown 814. The second handle 108 is positioned such that the recess 822 is aligned with the engagement crown 814, and the second handle 108 is pressed onto the engagement crown 814. The second handle 108 is also pressed onto the engagement crown 814 such that the handle annular projection 840 is received in the handle connection system annular channel 882 and the handle connection system annular projection 878 is received in the handle annular channel 844. Specifically, the fourth annular surface 860 contacts the eighth outer surface 876 and slides against the eighth outer surface 876. This contact causes the lugs 832 to be deflected inward towards the fitting 804 and/or the handle annular projection 840 to be deflected outward away from the fitting 804. In this way, the second handle 108 is capable of being coupled to the engagement crown 814 without the use of a fastener that couples the second handle 108 to the engagement crown 814.

While not shown in FIG. 11, it is understood that the process 1100 may be reversed for uncoupling the second handle 108 from the engagement crown 814. The second handle 108 may be uncoupled from the engagement crown 814 when, for example, it is desired to service or replace the valve cartridge 808. To uncouple the second handle 108 from the engagement crown 814, the second handle 108 is lifted from the escutcheon 104, causing the sixth annular surface 870 to contact the sixth outer surface 868 and slide against the sixth outer surface 868. This contact causes the lugs 832 to be deflected inward towards the fitting 804 and/or the handle annular projection 840 to be deflected outward away from the fitting 804. In this way, the second handle 108 is capable of being uncoupled to the engagement crown 814 without the use of a fastener that couples the second handle 108 to the engagement crown 814.

While FIGS. 8-11 describe the internal handle connection system 800 with reference to the second handle 108, it is understood that the faucet 100 includes a second internal connection structure, similar to the internal handle connection system 800, which couples the first handle 106 to the yoke 802.

VI. Configuration of Exemplary Embodiments

As utilized herein, the terms "about," "parallel," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. It is understood that the term "parallel" is intended to encompass de minimus variations as would be understood to be within the scope of the disclosure by those of ordinary skill in the art.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure.

The terms "coupled," "connected," "fastened," "attached," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "upper," etc.) are merely used to describe the orientation of various elements in the FIGURES. It should be noted that the orientation of various elements may differ according to other exemplary embodiments and that such variations are intended to be encompassed by the present disclosure. For example, while the faucet 100 has been illustrated as a centerset faucet, it is understood that the faucet 100 may also be a widespread faucet. In these embodiments, the escutcheon 104 would be distributed in a plurality (e.g., three, etc.) of discrete segments.

The construction and arrangement of the elements of the faucet 100, the internal handle connection system 200, the internal handle connection system 500, the internal handle connection system 800, and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the appended claims.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A process for installing a handle to a faucet comprising:
   inserting a valve cartridge in a fitting of a yoke;
   placing a nut around the fitting after inserting the valve cartridge in the fitting;
   threading the nut onto the fitting after placing the nut around the fitting; and
   pressing the handle onto the nut after threading the nut onto the fitting.

2. The process of claim 1, further comprising:
   placing a cap over a valve stem of the valve cartridge; and
   threading the cap into the fitting.

3. The process of claim 1, further comprising fastening an engagement crown to a valve stem of the valve cartridge before pressing the handle onto the nut;
   wherein pressing the handle onto the nut causes coupling of the engagement crown to the handle.

4. The process of claim 1, wherein:
   placing the nut around the fitting comprises placing the nut against a top surface of an escutcheon; and
   pressing the handle onto the nut comprises separating, by the nut, the handle from the top surface.

5. The process of claim 4, wherein threading the nut onto the fitting comprises separating, by the nut, a flange of the nut from the top surface.

6. The process of claim 4, wherein pressing the handle onto the nut comprises receiving, by a channel of the nut, a projection of the handle.

7. The process of claim 4, wherein pressing the handle onto the nut comprises at least one of:
   deflecting a projection of the handle relative to a projection of the nut; or
   deflecting a projection of the nut relative to a projection of the handle.

8. A process for installing a handle to a faucet comprising:
   inserting a valve cartridge in a fitting of a yoke;
   placing a ring around the fitting after inserting the valve cartridge in the fitting;
   placing a nut around the fitting after placing the ring around the fitting;
   threading the nut onto the fitting after placing the nut around the fitting;
   tightening the nut against the ring; and
   pressing the handle onto the ring after tightening the nut against the ring.

9. The process of claim 8, further comprising:
   placing a cap over a valve stem of the valve cartridge; and
   threading the cap into the fitting.

10. The process of claim 8, further comprising fastening an engagement crown to a valve stem of the valve cartridge before pressing the handle onto the ring;
    wherein pressing the handle onto the ring causes coupling of the engagement crown to the handle.

11. The process of claim 8, wherein:
    placing the ring around the fitting comprises placing the ring against a top surface of an escutcheon; and
    pressing the handle onto the ring comprises separating, by the ring, the handle from the top surface.

12. The process of claim 11, wherein threading the nut onto the fitting comprises separating, by the ring, a flange of the nut from the top surface.

13. The process of claim 8, wherein pressing the handle onto the ring comprises receiving, by a channel of the ring, a projection of the handle.

14. The process of claim 8, wherein pressing the handle onto the ring comprises at least one of:
    deflecting a projection of the handle relative to a projection of the ring; or
    deflecting a projection of the ring relative to a projection of the handle.

* * * * *